(12) United States Patent
Takaki et al.

(10) Patent No.: US 6,477,656 B1
(45) Date of Patent: Nov. 5, 2002

(54) SYSTEM FOR GENERATING CLOCK PULSE WHICH THE NUMBER OF PULSES OUTPUTTED WITHIN A PREDETERMINED TIME PERIOD IS BASED ON THE NUMBER OF CALCULATED DELAY STAGES

(75) Inventors: Kouichi Takaki; Mitsuo Azumai; Kenji Izumiya, all of Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/404,681

(22) Filed: Sep. 23, 1999

(30) Foreign Application Priority Data

Sep. 29, 1998 (JP) ............................................. 10-276092
Dec. 28, 1998 (JP) ............................................. 10-374278

(51) Int. Cl.$^7$ .............................. G06F 1/04; G06F 1/12
(52) U.S. Cl. ....................... 713/401; 713/502; 382/162; 382/276; 327/141
(58) Field of Search ................................ 713/400, 401, 713/500, 502; 382/162, 205, 241, 276, 293–298; 327/3, 39, 47, 141, 160–163

(56) References Cited

U.S. PATENT DOCUMENTS 3,603,728 A * 9/1971 Arimura ..................... 382/151
5,036,528 A * 7/1991 Le et al. ..................... 327/231
5,451,894 A * 9/1995 Guo ........................... 327/237
5,576,852 A * 11/1996 Sawada et al. ............. 358/475
5,896,489 A * 4/1999 Wada ......................... 358/1.2

* cited by examiner

Primary Examiner—Thomas Lee
Assistant Examiner—Thuan Du
(74) Attorney, Agent, or Firm—Frishauf, Holtz, Goodman & Chick, P.C.

(57) ABSTRACT

An image forming device scans in a main scanning direction in synchronization with dot clock pulses for each scanning line to form an image; a basic clock pulse generator generates basic clock pulses with a predetermined interval; a delayed clock pulse generator generates a group of plural delayed clock pulses having different phases respectively; a synchronism detector detects at least two delayed clock pulses synchronizing with an index signal from the plural delayed clock pulses; a calculating section calculates a number of delay stages existing within a given time period based on the two synchronizing delayed clock pulses; and a clock pulse controller selects delayed clock pulses sequentially delayed from the synchronizing delayed clock pulse within a predetermined time period based on the calculated number of delay stages to control a number of clock pulses outputted as the dot clock pulses during the predetermined time period.

22 Claims, 14 Drawing Sheets

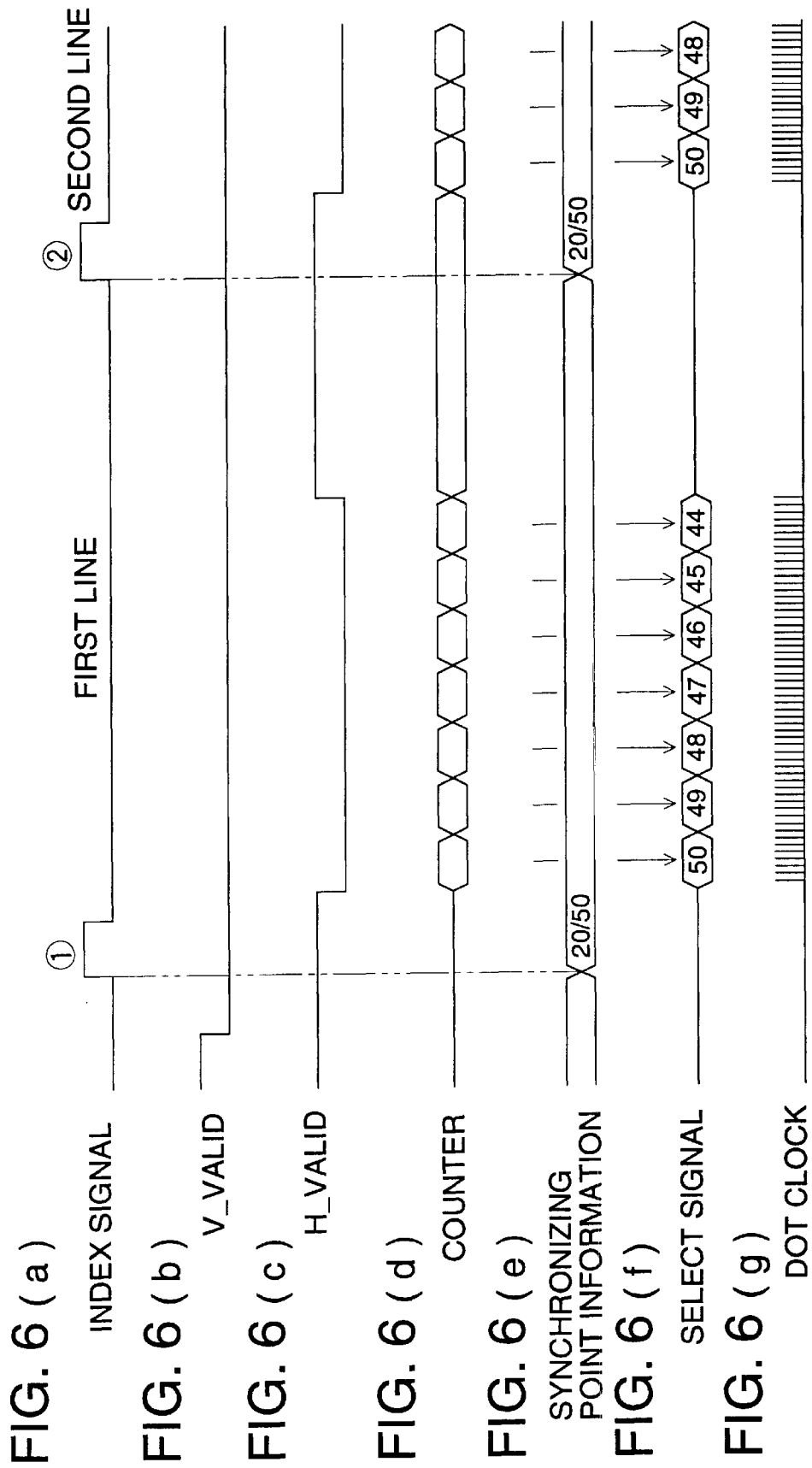

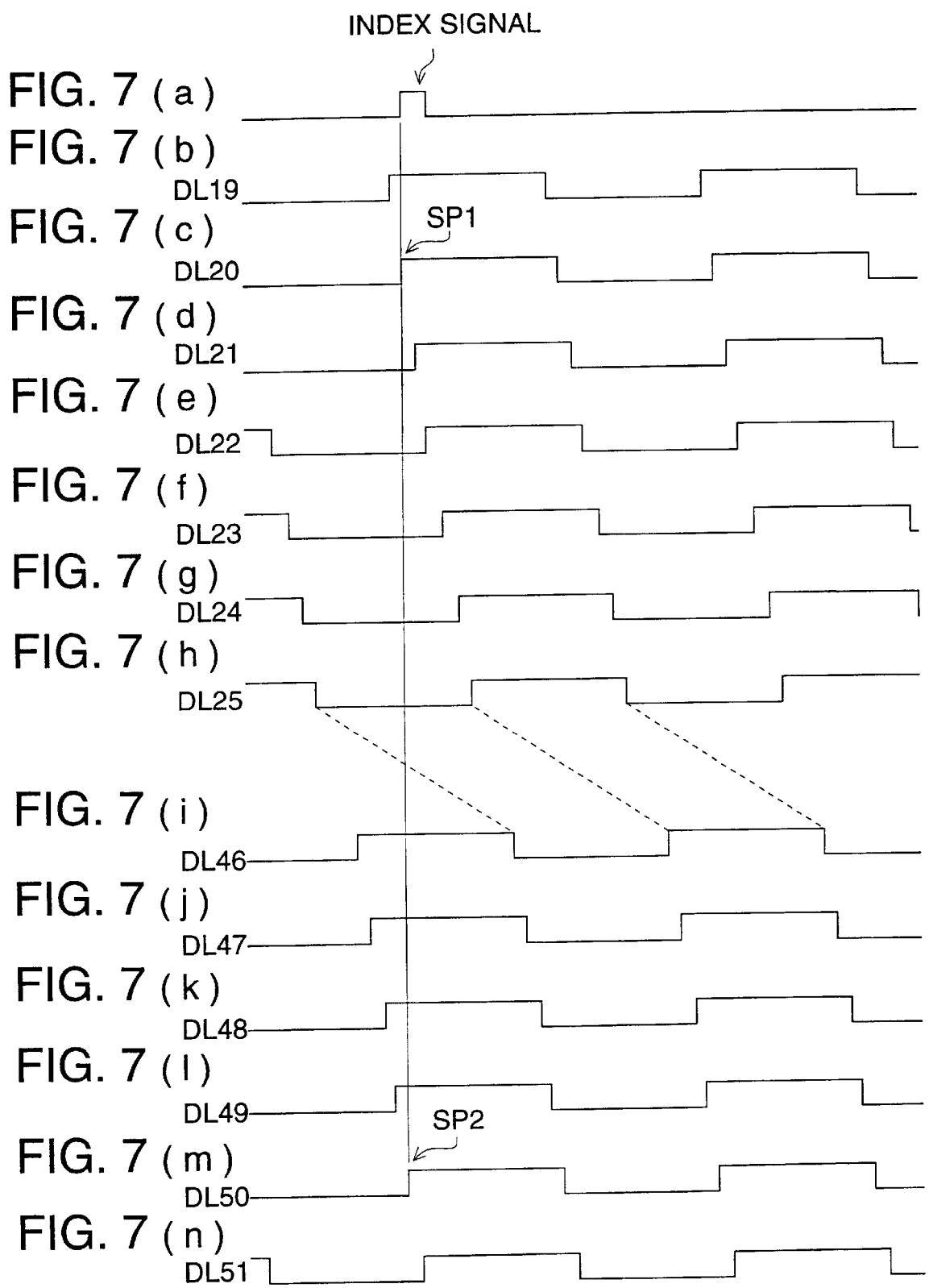

FIG. 8 (a) INDEX SIGNAL
FIG. 8 (b) H_VALID
FIG. 8 (c) DOT CLOCK Y 
FIG. 8 (d) DOT CLOCK M 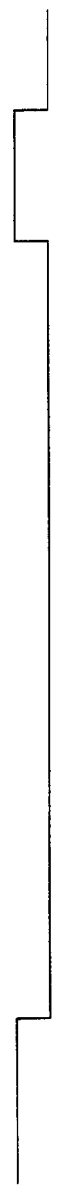
FIG. 8 (e) DOT CLOCK C 
FIG. 8 (f) DOT CLOCK K 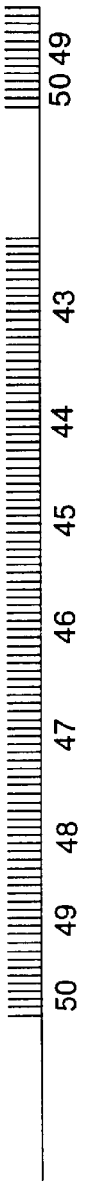

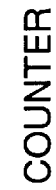
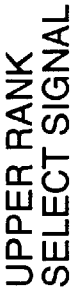
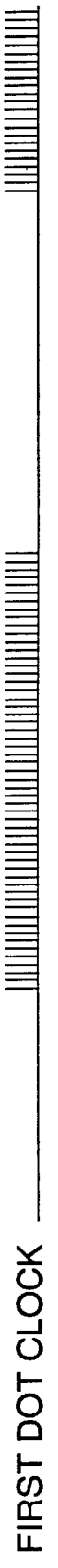
FIG. 10(a) INDEX SIGNAL
FIG. 10(b) V_VALID
FIG. 10(c) H_VALID
FIG. 10(d) COUNTER
FIG. 10(e) SYNCHRONIZING POINT INFORMATION
FIG. 10(f) UPPER RANK SELECT SIGNAL
FIG. 10(g) FIRST DOT CLOCK

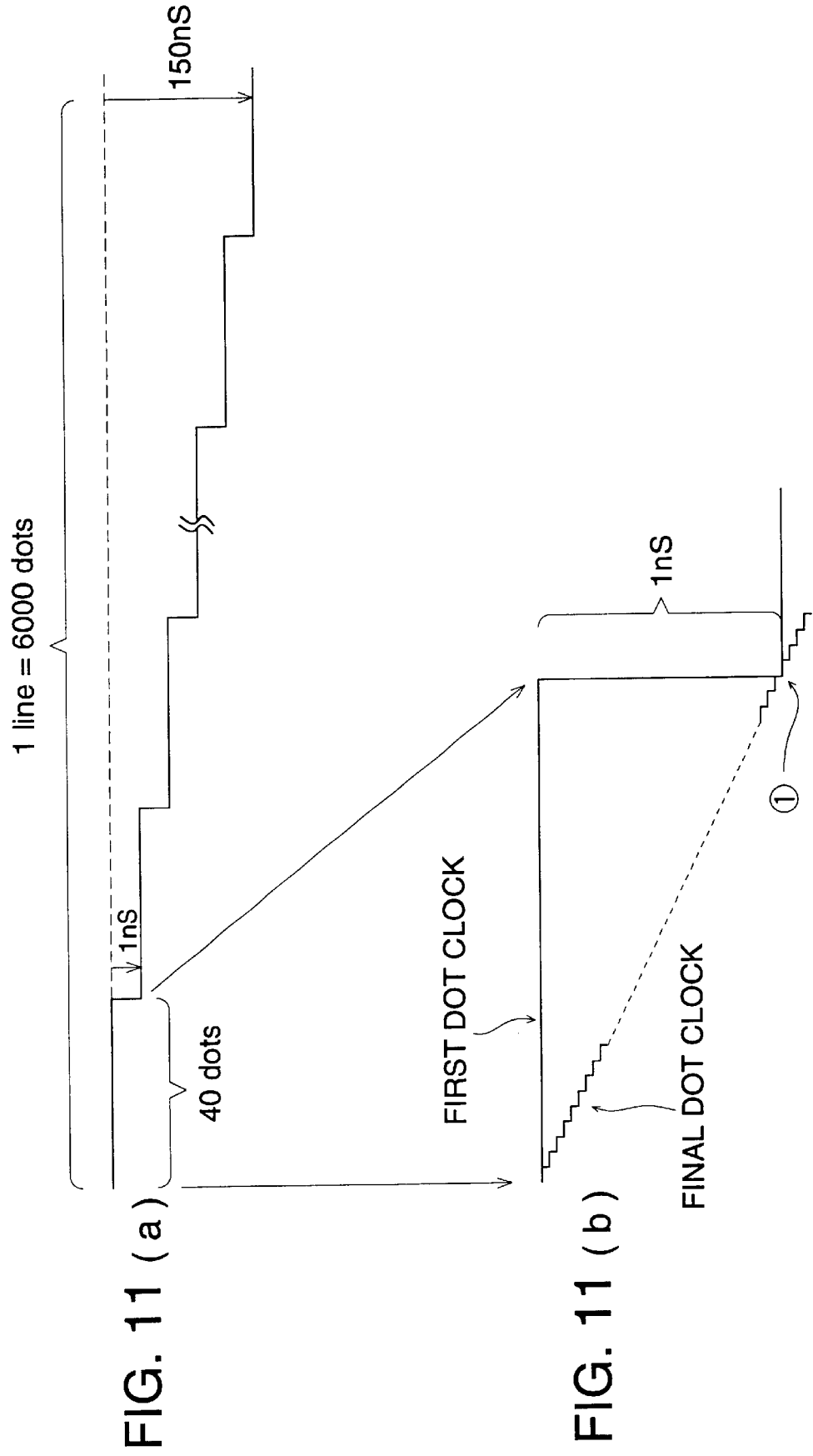

FIG. 12 (a) INDEX SIGNAL
FIG. 12 (b) H_VALID ←—— IMAGING REGION ——→
FIG. 12 (c) DOT CLOCK Y  10
FIG. 12 (d) DOT CLOCK M  20 21 22 .....
FIG. 12 (e) DOT CLOCK C  47 46 45 44 .....
FIG. 12 (f) DOT CLOCK K 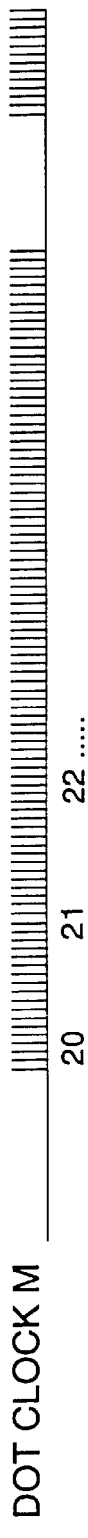 26 27 28 29 30 .....

SYSTEM FOR GENERATING CLOCK PULSE WHICH THE NUMBER OF PULSES OUTPUTTED WITHIN A PREDETERMINED TIME PERIOD IS BASED ON THE NUMBER OF CALCULATED DELAY STAGES

BACKGROUND OF THE INVENTION

This invention relates to a clock pulse generating circuit, and in particular, to a clock pulse generating circuit which adjusts the number of pulses of a drive clock pulse within a predetermined time to be a predetermined number.

In an image forming apparatus, an image is formed on an image bearing member by scanning the image bearing member which is rotating in the direction of sub-scanning by a laser beam which is modulated in accordance with image data in the direction of main scanning. In this case, on the basis of a drive clock pulse called a dot clock pulse, the laser beam is modulated by the image data.

Accordingly, in accordance with the predetermined number of pulses of the dot clock pulse, it is necessary to generate the dot clock pulse in order that the length of the image to be formed on the image bearing member in the direction of main scanning may be always constant.

Further, in recent years it has been developed a color image forming apparatus equipped with a plurality of units comprising means for charging, exposure, and development respectively in the neighborhood of the image bearing member forming color toner images on the image bearing member in one rotation of it, and transferring the images altogether onto a sheet of recording paper at a time. On the other hand, it has also been developed a color image forming apparatus equipped with a plurality of image bearing members in the neighborhood of an intermediate transfer member and equipped with means for charging, exposure, development, and transfer around the image bearing members respectively, transferring the toner images having been formed on the respective image bearing members sequentially onto the intermediate transfer member, and transferring the color toner images born on the intermediate transfer member altogether onto a sheet of recording paper at a time.

In an image forming apparatus of the former type, in some cases the length of the image formed on the image bearing member in accordance with the predetermined number of pulses of the dot clock pulse fluctuates owing to the fluctuation of the number of rotation of the polygonal mirror which carries out main scanning and to the aberration of the optical system.

On the other hand, in an image forming apparatus like the latter one which uses a plurality of means for exposure to form color toner images on the image bearing member and on the intermediate transfer member, owing to the dispersion of the characteristics of the optical systems such as the polygonal mirror and a lens in the respective means for exposure, the dispersion of the length of image formed on the image bearing member in the main scanning direction is produced among the respective means for exposure, resulting in producing a color deviation.

In such cases as described in the above, it is desirable that the timing (phase) and the frequency of rising up of dot clock pulses can be adjusted.

For a circuit as mentioned in the above that makes it possible to adjust the phase and the frequency, a VCXO (crystal oscillator of a voltage control type) and a DDS (digital direct synthesizer) have been known.

These VCXO and DDS are of no problem in precision, but they are not suitable to generation of a dot clock pulse in an image forming apparatus for the reasons that they make the cost of the apparatus high and that they are independent devices respectively which are not suitable to make the system of one chip (integration of circuits).

SUMMARY OF THE INVENTION

This invention has been performed in order to solve the above-mentioned problems, and it is an object of the invention to provide a clock pulse generating circuit capable of generating a dot clock pulse whose number of pulses generated in a predetermined time is fixed to a predetermined number in a single integrated circuit without using an additional part.

That is, this invention as means for solving the problems is such one as to be explained in the following:

An image forming apparatus, comprises:

an image forming device to scan in a main scanning direction in synchronization with dot clock pulses for each scanning line so as to form an image;

a basic clock pulse generating section to generate basic lock pulses with a predetermined interval;

a delayed clock pulse generating section to generate a group of plural delayed clock pulses having different phases respectively by delaying the basic clock pulse generate by the basic clock pulse generating section into plural delay stages;

a synchronism detecting section to detect at least two delayed clock pulses synchronizing with an index signal from the plural delayed clock pulses generated by said delayed clock pulse generating section;

a calculating section to calculate a number of delay stages existing within a given time period on the basis of the two synchronizing delayed clock pulses detected by the synchronism detecting section; and a clock pulse control section to selecting the delayed clock pulses sequentially delayed from the synchronizing delayed clock pulse from the group of plural delayed clock pulses within a predetermined time period on the basis of the calculated number of delay stages so as to control a number of clock pulses outputted as the dot clock pulses during the predetermined time period.

As a result of this, it is possible that the length of the image to be formed in the direction of the main scanning direction may be made always constant.

A clock pulse generating device, comprises:

a basic clock pulse generating section to generate basic lock pulses with a predetermined interval;

a delayed clock pulse generating section to generate a group of plural delayed clock pulses having different phases respectively by delaying the basic clock pulse generate by the basic clock pulse generating section into plural delay stages;

a synchronism detecting section to detect at least two delayed clock pulses synchronizing with an index signal from the plural delayed clock pulses generated by said delayed clock pulse generating section;

a calculating section to calculate a number of delay stages existing within a given time period on the basis of the two synchronizing delayed clock pulses detected by the synchronism detecting section; and a clock pulse control section to selecting the delayed clock pulses sequentially delayed from the synchronizing delayed clock pulse from the group of plural delayed clock pulses within a predetermined time period on the basis of the calculated number of delay stages so as to control a number of clock pulses outputted during the predetermined time period.

As a result of this, if is adopted to the scanning device, it is possible that the length of the image to be formed in the direction of the main scanning direction may be made always constant.

(1) A clock pulse generating circuit comprising a basic clock pulse generating section for generating closk pulses with a predetermined interval and a delayed clock pulse generating section for generating a group of a plurality of delayed clock pulses having different phases respectively by delaying the basic clock pulse generated by said basic clock pulse generating section, selecting sequentially delayed clock pulses having different phases respectively out of said plurality of delayed clock pulses, and generating clock pulses having a number of pulses generated within a predetermined time made to be a predetermined number by synthesizing these selected clock pulses.

In this clock pulse generating circuit, delayed clock pulses having different phases respectively is selected sequentially out of said plurality of delayed clock pulses, and clock pulses having the number of pulses generated within a predetermined time made to be a predetermined number is generated by synthesizing these selected clock pulses.

That is, the number of pulses within a predetermined time is adjusted not by a fine adjustment of the clock pulse frequency but by sequentially selecting the delayed clock pulses having their phases finely varied without varying the frequency within the predetermined time.

As a result of this, it has become possible to generate a dot clock pulse having the number of pulses within a predetermined time made to be a predetermined number in a single integrated circuit without using an additional part.

(2) A clock pulse generating circuit comprising a basic clock pulse generating section for generating pulses with a predetermined interval, a delayed clock pulse generating section for generating a group of a plurality of delayed clock pulses having different phases respectively by delaying the basic clock pulse generated by said basic clock pulse generating section, a synchronism detecting section for detecting a delayed clock pulse which is synchronized with an index signal out of the plurality of delayed clock pulses generated by said delayed clock pulse generating section, and a switching control section for sequentially selecting delayed clock pulses having different phases respectively out of said plurality of delayed clock pulses on the basis of a phase correction value which is obtained by referring to the clock pulse detected by said synchronism detecting section, and generating clock pulses having the number of pulses generated within a predetermined time made to be a predetermined number by synthesizing the delayed clock pulses having different phases respectively selected by said switching control section.

In this clock pulse generating circuit, a phase correction value is obtained by detecting a clock pulse which is synchronized with an index signal out of a plurality of delayed clock pulses, and on the basis of this phase correction value, delayed clock pulses having different phases respectively are sequentially selected out of the plurality of delayed clock pulses.

(3) A clock pulse generating circuit comprising a basic clock pulse generating section for generating pulses with a predetermined interval, a delayed clock pulse generating section for generating a group of a plurality of delayed clock pulses having different phases respectively by delaying the basic clock pulse generated by said basic clock pulse generating section, a synchronism detecting section for detecting a first synchronizing point information and a second synchronizing point information which is synchronized with an index signal out of the plurality of delayed clock pulses generated by said delayed clock pulse generating section, and a switching control section for sequentially selecting delayed clock pulses having different phases respectively out of said plurality of delayed clock pulses on the basis of the number of stages of the delayed clock pulses for a cycle period which are obtained from the first synchronizing point information and the second synchronizing point information detected by said synchronism detecting section, and generating clock pulses having the number of pulses generated within a predetermined time made to be a predetermined number by synthesizing the delayed clock pulses having different phases respectively selected by said switching control section.

In this clock pulse generating circuit, the number of stages of the delayed clock pulses for a cycle period is obtained from a first synchronizing point information and a second synchronizing point information, and on the basis of the number of stages for a cylce period, delayed clock pulses having different phases respectively are sequentially selected out of the plurality of delayed clock pulses.

(4) A clock pulse generating circuit comprising a basic clock pulse generating section for generating pulses with a predetermined interval, a delayed clock pulse generating section for generating a group of a plurality of delayed clock pulses having different phases respectively by delaying the basic clock pulse generated by said basic clock pulse generating section, a synchronism detecting section for detecting a first synchronizing clock pulse and a second synchronizing clock pulse which are synchronized with a first input signal and a second input signal respectively out of the plurality of delayed clock pulses generated by said delayed clock pulse generating section, and a switching control section for sequentially selecting delayed clock pulses having different phases respectively out of said plurality of delayed clock pulses on the basis of the amount of deviation at a leading position between said first synchronizing clock pulse and said second synchronizing clock pulse which are obtained by referring to said first synchronizing clock pulse and said second synchronizing clock pulse detected by said synchronism detecting section, and by synthesizing the delayed clock pulses having different phases respectively selected by said switching control section, synchronizing the front positions of clock pulses outputted on the basis of said first input signal and said second input signal respectively with each other and making the number of pulses of said clock pulses outputted on the basis of said first input signal and said second input signal respectively to be a predetermined number within a predetermined time.

In this clock pulse generating circuit, the front positions of clock pulses outputted on the basis of said first input signal and said second input signal respectively are synchronized with each other, and the number of pulses of said clock pulses outputted on the basis of said first input signal and said second input signal respectively is made to be a predetermined number within a predetermined time.

(5) A clock pulse generating circuit comprising a basic clock pulse generating section for generating closk pulses with a predetermined interval and a delayed clock pulse generating section for generating a group of a plurality of delayed clock pulses having different phases respectively by delaying the basic clock pulse generated by said basic clock pulse generating section, selecting sequentially delayed clock pulses having different phases respectively out of said plurality of delayed clock pulses for each pulse, and generating clock pulses having the number of pulses generated within a predetermined time made to be a predetermined number by synthesizing these selected clock pulses.

In this clock pulse generating circuit, delayed clock pulses having different phases respectively is selected sequentially out of said plurality of delayed clock pulses for each pulse, and clock pulses having the number of pulses generated within a predetermined time made to be a predetermined number is generated by synthesizing these selected clock pulses.

(6) A clock pulse generating circuit comprising a basic clock pulse generating section for generating pulses with a predetermined interval, a first delayed clock pulse generating section for generating a first group of a plurality of delayed clock pulses having different phases respectively by delaying the basic clock pulse generated by said basic clock pulse generating section, a first selecting means for selecting sequentially delayed clock pulses having different phases respectively out of said first group of said plurality of delayed clock pulses and for synthesizing the selected clock pulses such that a numbe of of pulses generated within a predetermined time is made to be a predetermined number, a second delayed clock pulse generating section for generating a second group of a plurality of delayed clock pulses having different phases respectively by delaying the delayed clock pulse selected by said first selecting means, selecting sequentially delayed clock pulses having different phases respectively out of said second group of said plurality of delayed clock pulses for each pulse, and generating clock pulses having a number of pulses generated within a predetermined time made to be a predetermined number by synthesizing these selected clock pulses.

In this clock pulse generating circuit, delayed clock pulses having different phases respectively is selected sequentially out of said first group of said plurality of delayed clock pulses such that a numbe of of pulses generated within a predetermined time is made to be a predetermined number, a second group of a plurality of delayed clock pulses are generated from the selected delayed clock pulses and delayed clock pulses having different phases respectively are selected sequentially for each pulse from said second group of the plurality of delayed clock pulses.

(7) A clock pulse generating circuit comprising a basic clock pulse generating section for generating pulses with a predetermined interval, a first delayed clock pulse generating section for generating a first group of a plurality of delayed clock pulses having different phases respectively by delaying the basic clock pulse generated by the basic clock pulse generating section, a synchronism detecting section for detecting a delayed clock pulse which is synchronized with an index signal out of said first group of the plurality of delayed clock pulses generated by said delayed clock pulse generating section, a first switching control section for sequentially selecting delayed clock pulses having different phases respectively out of said first group of said plurality of delayed clock pulses on the basis of a phase correction value which is obtained by referring to the clock pulse detected by said synchronism detecting section such that a numbe of of pulses generated within a predetermined time is made to be a predetermined number, a second delayed clock pulse generating section for generating a second group of a plurality of delayed clock pulses having different phases respectively by delaying the delayed clock pulse selected by said first switching control section by a smaller interval, and a second switching control section for sequentially selecting delayed clock pulses having different phases respectively out of said second group of said plurality of delayed clock pulses for each pulse.

In this clock pulse generating circuit, a phase correction value is obtained by detecting a clock pulse which is synchronized with an index signal out of a plurality of delayed clock pulses, and on the basis of this phase correction value, delayed clock pulses having different phases respectively is selected sequentially out of said first group of said plurality of delayed clock pulses such that a numbe of of pulses generated within a predetermined time is made to be a predetermined number, a second group of a plurality of delayed clock pulses are generated from the selected delayed clock pulses and delayed clock pulses having different phases respectively are selected sequentially for each pulse from said second group of the plurality of delayed clock pulses.

(8) A clock pulse generating circuit comprising a basic clock pulse generating section for generating pulses with a predetermined interval, a first delayed clock pulse generating section for generating a first group of a plurality of delayed clock pulses having different phases respectively by delaying the basic clock pulse generated by said basic clock pulse generating section, a synchronism detecting section for detecting a first synchronizing point information and a second synchronizing point information which are synchronized with an index signal out of the plurality of delayed clock pulses generated by said delayed clock pulse generating section, a first switching control section for sequentially selecting delayed clock pulses having different phases respectively out of said first group of said plurality of delayed clock pulses on the basis of the number of stages of the delayed clock pulses for a cycle period which are obtained from the first synchronizing point information and the second synchronizing point information detected by said synchronism detecting section, a second delayed clock pulse generating section for generating a second group of a plurality of delayed clock pulses having different phases respectively by delaying the delayed clock pulse selected by said first switching control section by a smaller interval, and a second switching control section for sequentially selecting delayed clock pulses having different phases respectively out of said second group of said plurality of delayed clock pulses for each pulse.

In this clock pulse generating circuit, the number of stages of the delayed clock pulses for a cycle period is obtained from a first synchronizing point information and a second synchronizing point information, and on the basis of the number of stages for a cylce period, delayed clock pulses having different phases respectively is selected sequentially out of said first group of said plurality of delayed clock pulses such that a numbe of of pulses generated within a predetermined time is made to be a predetermined number, a second group of a plurality of delayed clock pulses are generated from the selected delayed clock pulses and delayed clock pulses having different phases respectively are selected sequentially for each pulse from said second group of the plurality of delayed clock pulses.

(9) A clock pulse generating circuit comprising a basic clock pulse generating section for generating pulses with a predetermined interval, a first delayed clock pulse generating section for generating a first group of a plurality of delayed clock pulses having different phases respectively by delaying the basic clock pulse generated by said basic clock pulse generating section, a synchronism detecting section for detecting a first synchronizing clock pulse and a second synchronizing clock pulse which are synchronized with a first input signal and a second input signal respectively out of the first group of the plurality of delayed clock pulses, a first switching control section for sequentially selecting delayed clock pulses having different phases respectively out of said first group of said plurality of delayed clock pulses on the basis of the amount of deviation at the leading position between said first synchronizing clock pulse and said second synchronizing clock pulse which are obtained by referring to said first synchronizing clock pulse and said second synchronizing clock pulse detected by said synchronism detecting section, a second delayed clock pulse generating section for generating a second group of a plurality of delayed clock pulses having different phases respectively by delaying the delayed clock pulse selected by said first switching control section by a smaller interval, and a second switching control section for sequentially selecting delayed clock pulses having different phases respectively out of said second group of said plurality of delayed clock pulses for each pulse, wherein the leading position of a clock pulse outputted based on the first input signal and the second input signal is synchronized by synthesiszng the delayed clock pulse having different phases respectively selected by said switching control section and a number of the clock pulse outputted based on the first input signal and the second input signal is made to be a predetermined number.

In this clock pulse generating circuit, the leading positions of clock pulses outputted on the basis of said first input signal and said second input signal respectively are synchronized with each other, and the number of pulses of said clock pulses outputted within a predetermined time on the basis of said first input signal and said second input signal respectively is made to be a predetermined number, further, the second group of delayed clock pulses are generated from the selected delayed clock pulses and clock pulses are sequentially selected for each pulse from the second group of the plurality of delayed clock pulses.

Namely, the leading positions of at least two clock pulses are synchronized with each other without adjusting finely the frequency of clock pulses and the number of pulses are made to be a predetermined number. Further, the second group of the plurality of delayed clock pulses are generated by changing gradually finely the phase of the selected delayed clock pulses and delayed clock pulses having different phase respectively are selected for each pulse.

BREIEF DESCRIPTION OF THE DRAWINGS

FIGS. 6(a) to 6(g) are time charts explaining an operation of the clock generating circuit of the first embodiment.

FIGS. 7(a) to 7(n) are time charts explaining synchronized states between an index signal and delayed clock pulses.

FIGS. 8(a) to 8(f) are time charts explaining an operation of the clock generating circuit of the first embodiment.

Figure 9:
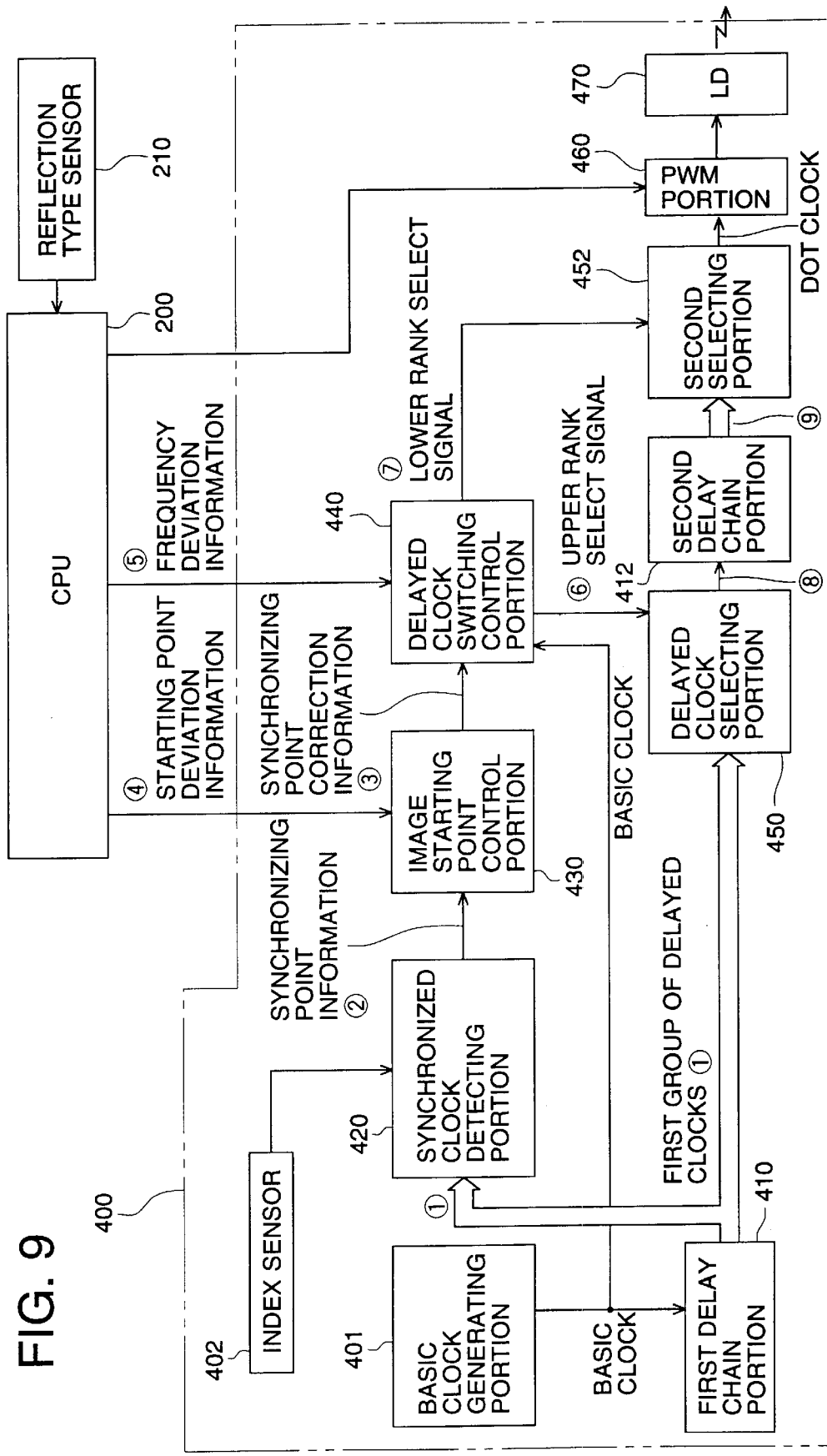

FIG. 9 is a block diagram showing the circuit structure of the electrical exposure unit 400 in the second embodiment.

FIGS. 10(a) to 10(g) are time charts explaining an operation of the clock generating circuit of the second embodiment.

FIGS. 11(a) and 11(b) are illustrations of a scanning line explaining an operation of the clock generating circuit of the second embodiment.

FIGS. 12(a) to 12(f) are time charts explaining an operation of the clock generating circuit of the second embodiment.

Figure 13:
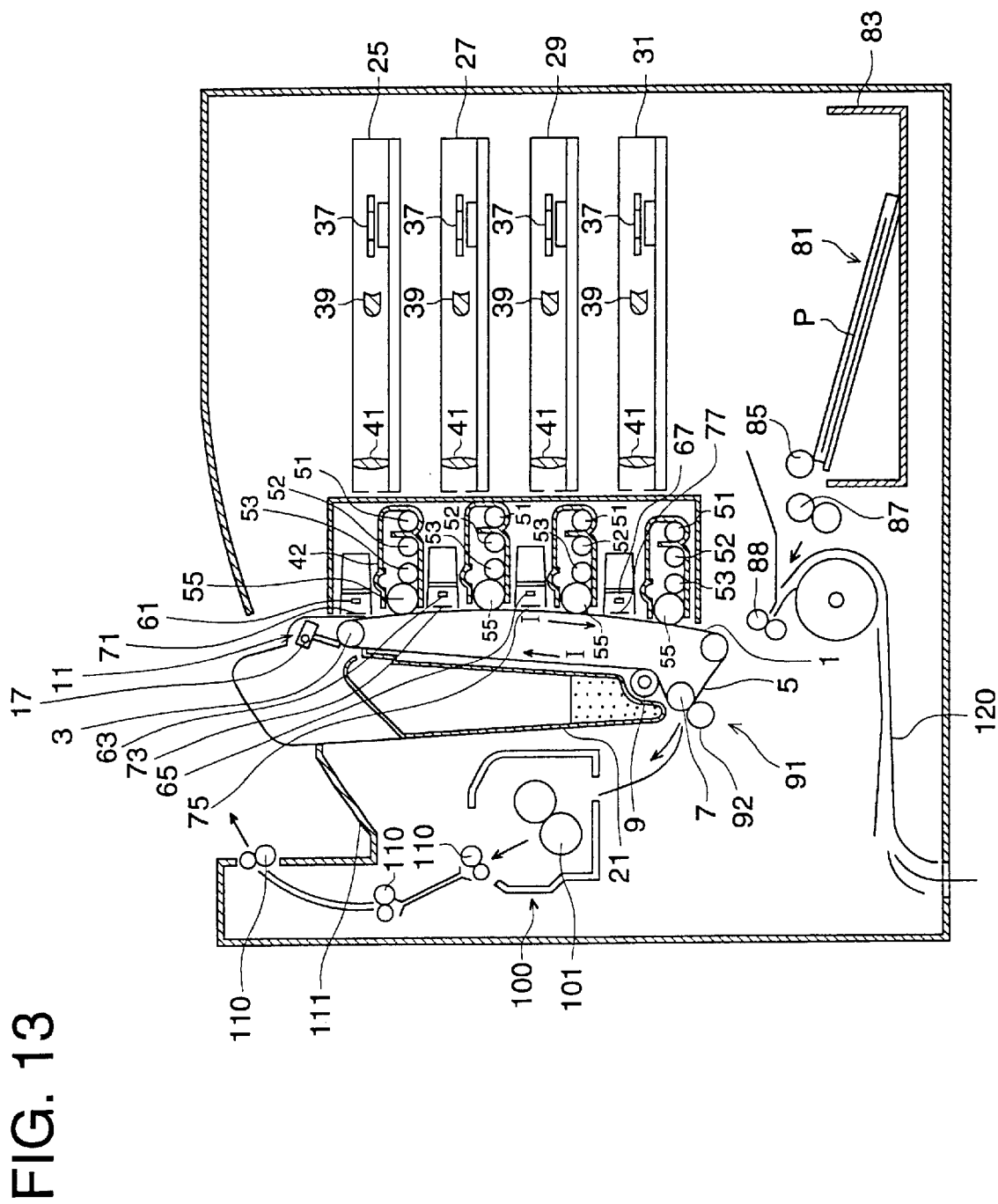

FIG. 13 is a schematic view showing a construction of an image forming apparatus to which the clock generating circuit of the present invention can be applicable.

Figure 14:
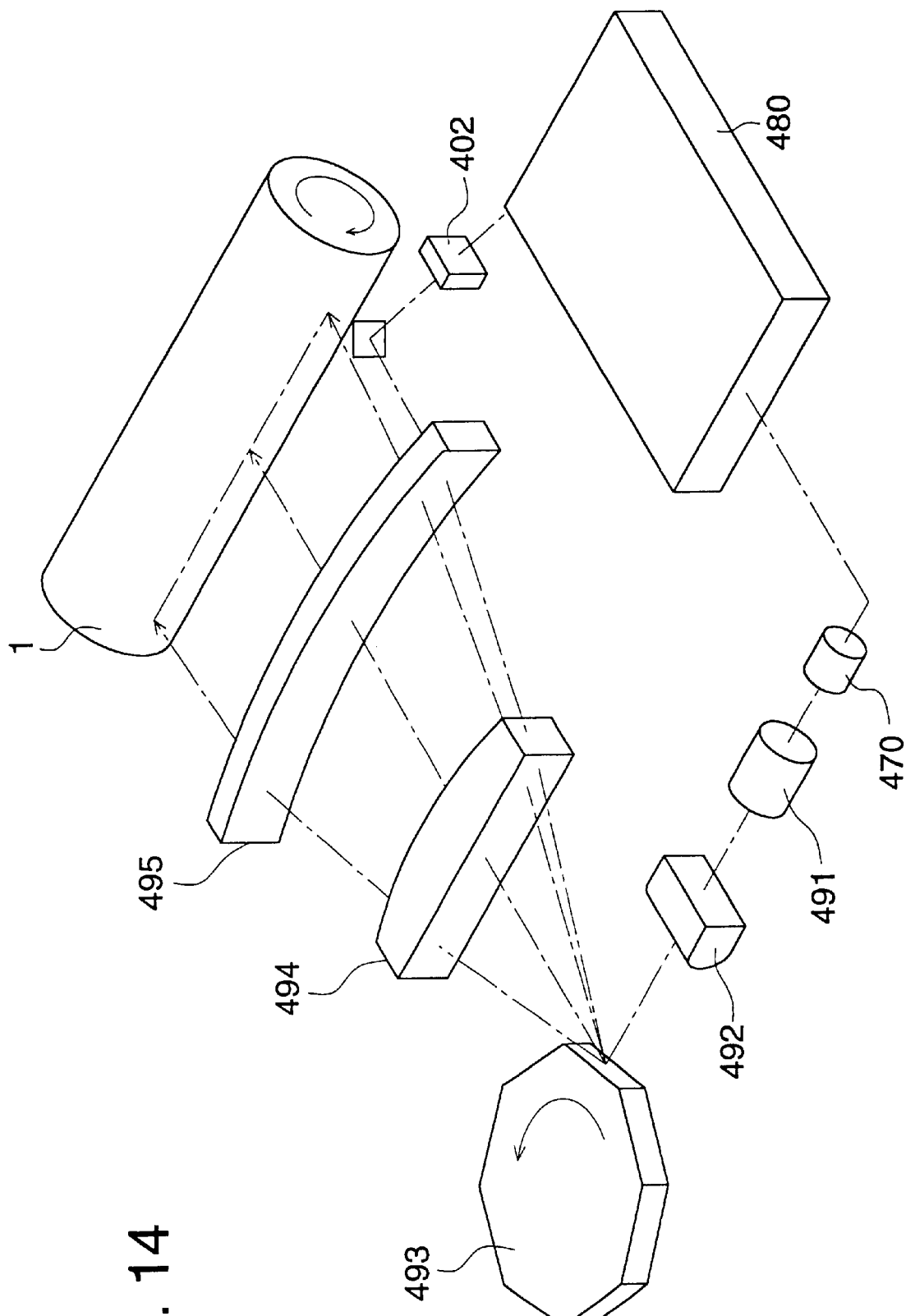

FIG. 14 is a perspective view showing an optical system for use in the image forming apparatus of FIG. 13.

DETAILED DESCRIPTION OF THE PREFERRED EMBODIMENT

In the following, with reference to the drawings, examples of the embodiment of a clock pulse generating circuit of this invention will be explained in detail. First, the whole structure of a color image forming apparatus will be explained by using FIG. 13 which is a drawing of the mechanical structure of the color image forming apparatus to which a clock pulse generating circuit of an example of the embodiment of this invention is applicable.

In addition, the image forming apparatus of this example of the embodiment is a multi-color image forming apparatus, and it is taken for instance herein a color image forming apparatus using toners of four colors, namely, Y (yellow), M (magenta), C (cyan), and K (black).

First, the image bearing member (photoreceptor) 1 of an endless belt shape entrained around the upper roller 3, the lower roller 5, and the side roller 7 is extended in the upward and downward direction by the upper roller 3 and the lower roller 5, and is driven in the direction of the arrow marks I.

Further, on the surface of the portion of the image bearing member 1 moving from down to up, the pressing roller 9 as a guide means for guiding the image bearing member 1 to the direction of a closed space formed by the image bearing member 1 by pressing it to the direction of the closed space.

At the upper portion of the surface of the portion of the image bearing member which is moving from down to up, there is provided the cleaning means 11 which is in rubbing contact with the image bearing member 1 and removes the toner particles on the image bearing member 1.

Under the cleaning means 11 along the image bearing member 1, there is provided the recovery box 21 as a collecting means for collecting the toner particles removed by the cleaning means 11.

In the following, the explanation of the latent image forming means for forming a latent image on the image bearing member 1 will be given. The image forming apparatus of this example of the embodiment is a four-color image forming apparatus, and accordingly it has four means for forming a latent image corresponding to the respective colors.

That is, they are the optical writing section for Y 25 which forms a latent image for Y (yellow) using a laser beam on the image bearing member 1, the optical writing section for M 27 which forms a latent image for M (magenta) using a laser beam on the image bearing member 1, the optical writing section for C 29 which forms a latent image for C (cyan) using a laser beam on the image bearing member 1, and the optical writing section for K 31 which forms a latent image for K (black) using a laser beam on the image bearing member 1.

Next, the developing units will be explained. Four developing units for developing the latent images for the respective colors which have been formed on the image bearing member 1 are provided. That is, they are the developing unit for Y 42 for developing the latent image which has been formed by the optical writing section for Y 25, the developing unit for M 43 for developing the latent image which has been formed by the optical writing section for M 27, the developing unit for C 45 for developing the latent image which has been formed by the optical writing section for C 29, and the developing unit for K 47 for developing the latent image which has been formed by the optical writing section for K 31.

Further, corresponding to the developing units for the respective colors 42, 43, 45, and 47, the charging electrodes of the charging means for giving charge to the image bearing member 1 are provided. That is, they are the charging electrode for Y 61, the charging electrode for M 63, the charging electrode for C 65, and the charging electrode for K 67. Besides, the charging means for the respective colors of this example of the embodiment comprise the grids 71, 73, 75, and 77 respectively for controlling the charged electric potential on the image bearing member 1.

81 is the paper feeding section, which is equipped with the cassette 83 receiving the transfer paper P as a transfer material. The transfer paper P in the cassette 83 is conveyed out by the conveying-out roller 85, is transported by the transport roller pair 87 and the registration roller 88, being held between them, and is fed to the transfer means 91.

At the transfer means 91, there is provided the transfer roller 92 which is kept at an electric potential of the opposite polarity to the image bearing member 1; this transfer roller 92 is disposed in such a manner as to hold the image bearing member 1 between it and the cooperating side roller 7.

100 is the fixing section for fusing the toner particles to the transfer paper P by applying heat and pressure to the transfer paper P with the pair of heat rollers 101 pressed to keep the paper between them, and 110 is the pair of transport rollers which transports the transfer paper P having been subjected to heat fixing to the receiving tray 111, with the paper held between them.

Further, 120 is the paper transport path on which the transfer paper P of a different size fed from a paper feeding section provided outside the apparatus is transported.

In the following, the overall operation of the image forming apparatus of the above-described structure will be explained.

When the image bearing member 1 is driven in the direction of the arrow marks I, the surface potential of the image bearing member 1 is made to reach to a predetermined value by the charging means for Y composed of the charging electrode 61 and the grid 71.

Next, a latent image is formed on the image bearing member 1 by the optical writing means for Y 25. Then, toner particles in the developer carried on the developing sleeve 55 of the developing unit for Y 42 are removed onto the image bearing member 1 by Coulomb's force, to form a toner image on the image bearing member 1.

The same operation as the above is performed for the rest of colors, namely, M, C, and K, and toner images of Y, M, C, and K are formed on the image bearing member 1.

On the other hand, from the paper feeding section 81, the transfer paper P is fed toward the transfer means 91 by the conveying-out roller 85 and the transport roller pair 87.

The fed transfer paper P is adjusted for its timing against the toner images on the image bearing member 1 to be in synchronism with them and fed to the transfer means 91 by the registration roller 88; then, it is charged by the transfer roller 92 of the transfer means 91, and the toner images on the image bearing member 1 is transferred onto the transfer paper P.

Next, the transfer paper P is heated and pressed in the fixing section 100, with the toner images fused on it, and is ejected onto the receiving tray 111 by the pair of transport roller 110.

On the other hand, the residual toner particles after transfer on the image bearing member 1 are removed by the blade 17 of the cleaning means 11, and are stored in the collection box 21.

Incidentally, the structure of the optical writing section is as shown in FIG. 14. That is, the laser diode LD emits light on the basis of the signal generated in the circuit section 480. Then, the laser beam from the LD 47 having been passed through the collimator lens 491 and the cylindrical lens 492 is deflected for scanning by the polygonal mirror 493, passing through the fθ lens 494 and the cylindrical lens 494, and scans the image bearing member 1 for writing. In addition, a part of the laser beam deflected by the polygonal mirror is led to the index sensor 402 for detecting the timing.

In the following, an example of the embodiment of a clock pulse generating circuit of this invention will be explained in detail with reference to the drawings.

STRUCTURE OF THE FIRST EXAMPLE OF PRACTICE OF THE CLOCK PULSE GENERATING CIRCUIT

Figure 1:
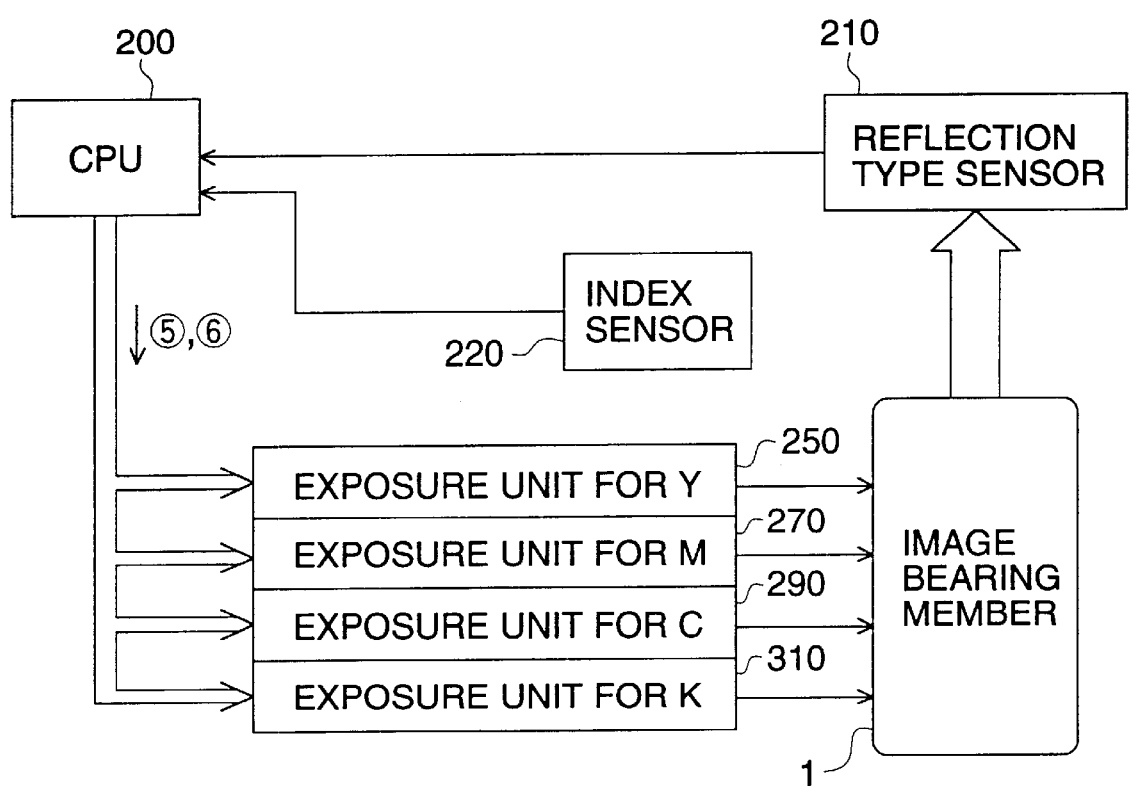
FIG. 1 is a drawing of the structure showing the overall electrical structure of an example of the embodiment of this invention.

FIG. 1 is a drawing of the structure showing the overall electrical structure of an example of the embodiment of this invention. 200 is the CPU as control means for generating the dot clock pulses to be described later, 210 is the sensor of a reflecting type for detecting deviation by sensing the reflected light from a predetermined image formed on the image bearing member 1, 250 is the exposure unit for Y for reading out an image signal in synchronism with a dot clock pulse and outputting a laser beam having been modulated in accordance with the signal value of the image signal to the image bearing member 1, 270 is the exposure unit for M for reading out an image signal in synchronism with a dot clock pulse and outputting a laser beam having been modulated in accordance with the signal value of the image signal to the image bearing member 1, 290 is the exposure unit for C for reading out an image signal in synchronism with a dot clock pulse and outputting a laser beam having been modulated in accordance with the signal value of the image signal to the image bearing member 1, and 310 is the exposure unit for K for reading out an image signal in synchronism with a dot clock pulse and outputting a laser beam having been modulated in accordance with the signal value of the image signal to the image bearing member 1.

Figure 2:
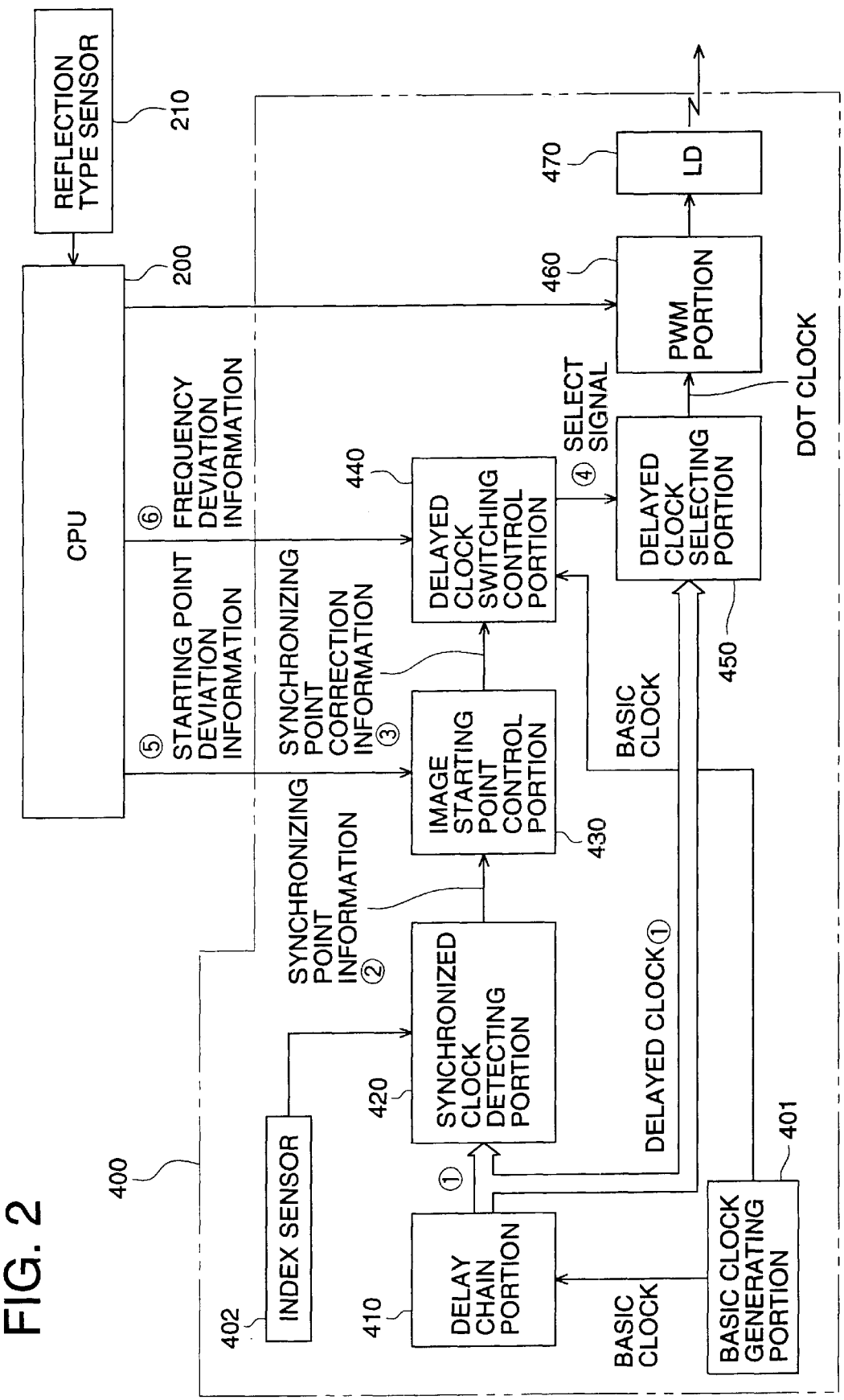
FIG. 2 is a block diagram showing the circuit structure of the electrical exposure unit 400 in the first embodiment.

Further, FIG. 2 is a block diagram showing the circuit structure of the electrical exposure unit 400 in the above-described exposure unit for Y, exposure unit for M, exposure unit for C, and exposure unit for K, together with the CPU 200 etc. In addition, in this FIG. 2, only the exposure unit 400 is shown, but actually the equivalent ones are provided in the exposure units for M, C, and K respectively.

Figure 3:
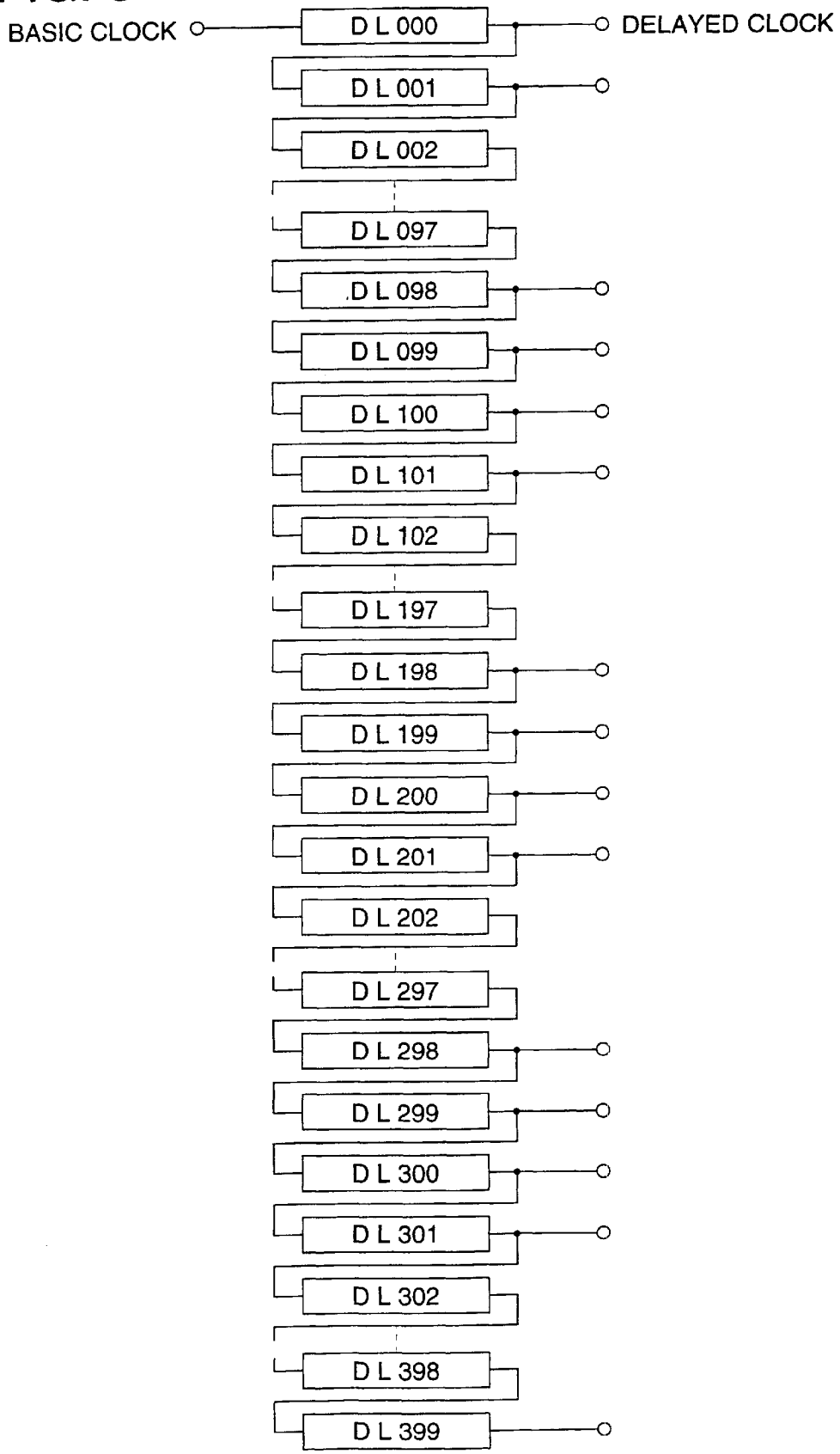
FIG. 3 is an illustration showing delay elements cascaded like a chain with the number of stages.

In this FIG. 2, the delay chain section 410 is the group of delay elements composing the delay section of this invention for obtaining a plurality of delayed clock pulses having phases which are a little different from one another respectively (① in FIG. 2) by delaying the input clock pulse (basic clock pulse from the basic clock pulse generating section 401). In the above, as shown in FIG. 3, it is desirable that the delay chain section 410 is made up of the delay elements cascaded like a chain with the number of stages made to be capable of generating the delayed clock pulses having a little different phases one another, wherein the phase shift ranges over tow or more periods.

Besides, the basic clock pulse generating section 401 may be built in each of the exposure units, however, it is possible to distribute the basic clock pulse from a single clock pulse generating section 401 to each of the exposure units.

Further, the index sensor 402 is provided for detecting the standard position in the scanning by the laser beam.

FIG. 7 shows the index signal and the delayed clock pulses outputted from the respective delay elements.

The synchronized clock pulse detecting section 420 is a detecting means for detecting the stage number (synchronizing point) of the signal which is synchronized with the index signal out of the group of the delayed clock pulses, and outputs the synchronizing point information (② in FIG. 2). In the above, it is desirable that the synchronized clock pulse detecting section 420 can output the first synchronizing point information SP1 at which synchronization with the index signal firstly occurs and the second synchronizing point information SP2 at which synchronization with the index signal secondly occurs.

In FIG. 7, the first synchronizing point information SP1 indicates the synchronizing point of the delayed clock pulse from the delay element DL 20, and the second synchronizing point information SP2 indicates the synchronizing point of the delayed clock pulse from the delay element DL 50.

The image leading end control section 430 receives the synchronizing point information (② in FIG. 2) from the synchronized clock pulse detecting section 420, and outputs the synchronizing point correction information (③ in FIG. 2) on the basis of the image leading end deviation information (⑤ in FIG. 1, (⑤ in FIG. 2) from the CPU 200.

The delayed clock pulse switching control section 440 obtains the phase correction value on the basis of the synchronizing point correction information (③ in FIG. 2) from the image leading end control section 430 and the frequency deviation information (⑥ in FIG. 2) from the CPU 200, and outputs the select signal (④ in FIG. 2) indicating of which phase the delayed clock pulse is to be selected out of the group of the delayed clock pulses.

In addition, the image leading end deviation information and the frequency deviation information will be explained later.

The delayed clock pulse selecting section 450 receives the select signal from the delayed clock pulse switching control section 440, selecting the delayed clock pulse having a correspondent phase out of the group of the delayed clock pulses, and outputs it as a dot clock pulse.

Further, the PWM section 460 receives the dot clock pulse and the image signal, and generates a signal for driving the laser diode (LD) 470. From the LD 470, a laser beam which is modulated for pulse width in accordance with the value of the image signal is emitted, and applied to the image bearing member 1.

Figure 4:
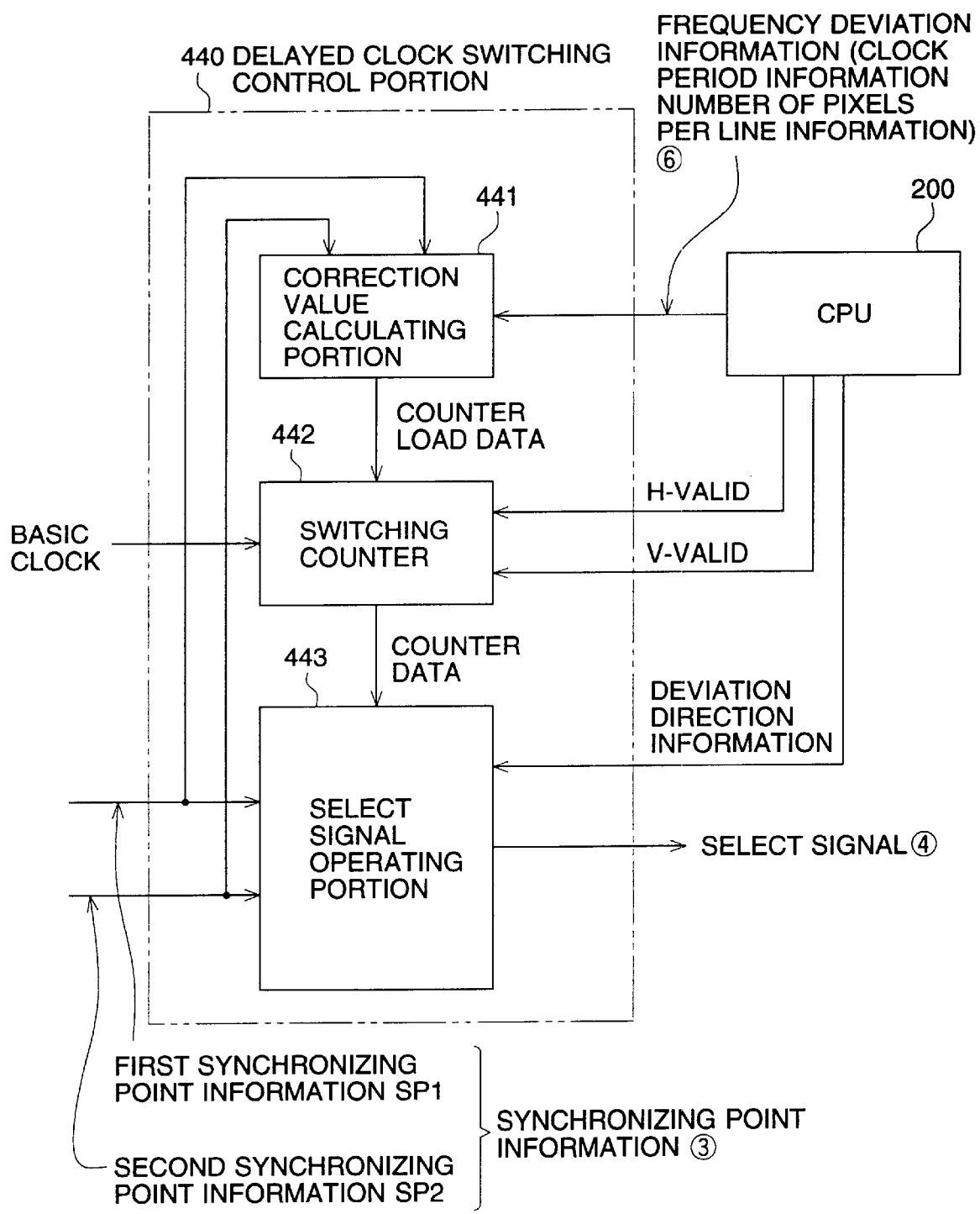
FIG. 4 is a block diagram showing a structure of a principal part of the clock generating circuit of the first embodiment.

Further, as shown in FIG. 4, the delayed clock pulse switching control section 440 comprises the correction value calculating section 441 for obtaining the phase correction value corresponding to the frequency deviation information as a count value for correction (count load data), the switching counter 442 which generates a count data for switching over the stage number of the group of delayed clock pulses to be selected by counting the count load data, and the select signal operating section 443 for outputting the select signal indicating of which phase the delayed clock pulse to be selected out of the group of the delayed clock pulses by referring to the count data and the synchronizing point information. In addition, it is desirable for the reason to make the switching over to be difficult to be noticed that, in the switching counter 442, the switching-over point of the delayed clock pulses is to be varied for every line.

PRINCIPLE OF DETECTION OF DEVIATION

Figure 5:
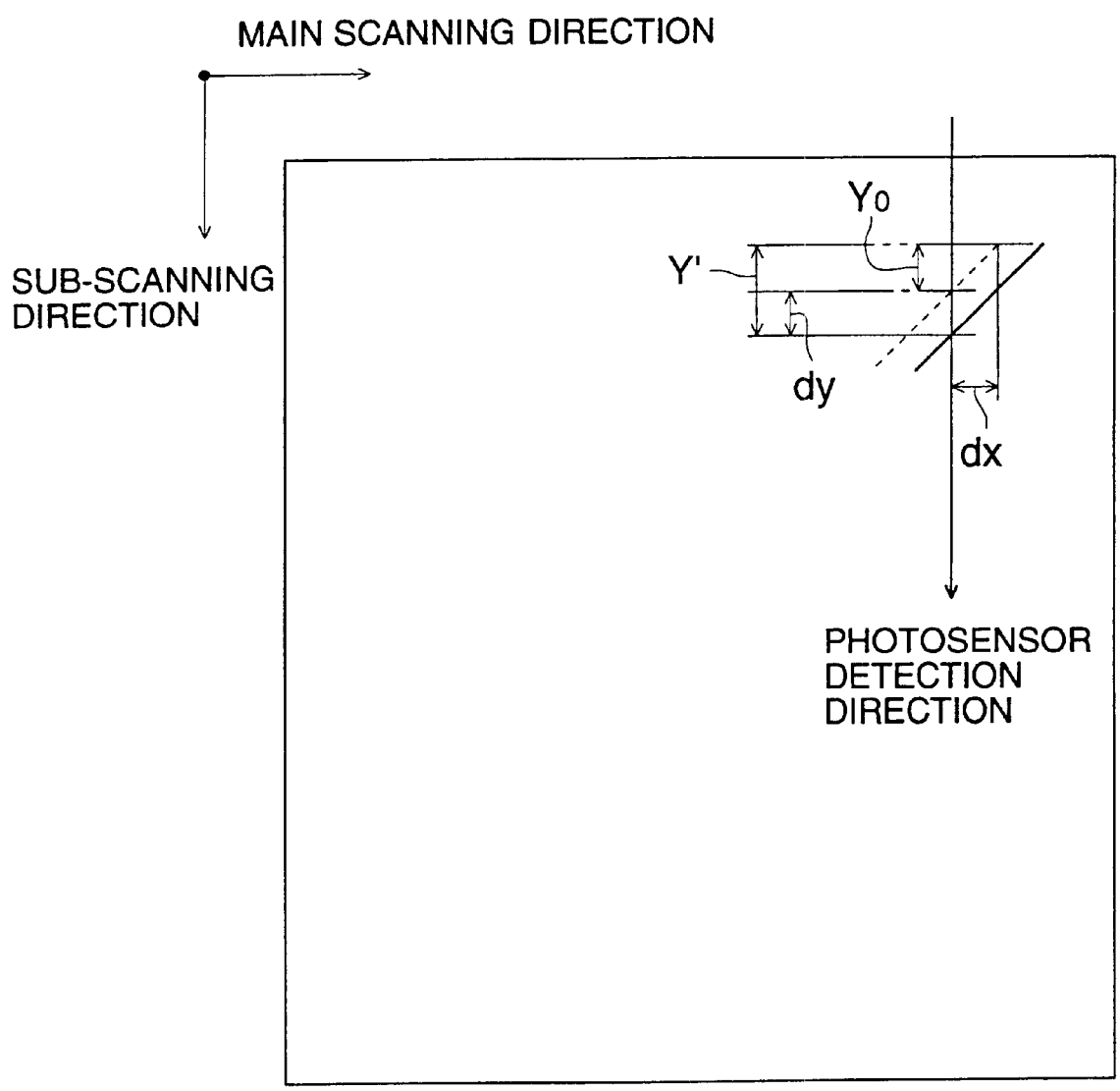
FIG. 5 is an illustration explaining a method of detecting a deviation.

Now, with reference to FIG. 5, how deviation is detected will be simply explained. An image of a predetermined pattern (here, a pattern made up of a folded line composed of a horizontal line and an oblique line making an acute angle with the former) is formed at the leading end side on the image bearing member 1 by the exposure units 250, 270, 290, and 310. A pattern indicated by the solid lines has been formed on the image bearing member, but if it is properly formed, a pattern indicated by the broken line is expected.

Here, a deviation of dx is produced in the direction of main scanning owing to deviations in the exposure units, aberrations of the lenses in the optical systems etc. In this case, by performing the sensing by the reflection type sensor 210 disposed at a position capable of sensing the pattern with the image bearing member moved in the direction of sub-scanning, the time interval for sensing corresponding to the distance Y' from the horizontal line to the oblique line of the predetermined pattern can be obtained.

The difference dy between the distance Y' and the distance Y0, which is the distance between the horizontal line and the oblique broken line can be obtained from the moving velocity of the image bearing member in the direction of sub-scanning and the difference between the sensing time interval for the horizontal line and the oblique line indicated by the solid lines and the theoretical time interval corresponding to the broken lines. Next, let θ be the angle made by the horizontal line and the oblique line, then the deviation dx in the direction of main scanning can be obtained by the following equation:

$$dx = dy/\tan \theta.$$

Accordingly, by performing the formation of the predetermined pattern and the sensing of it for the respective colors Y, M, C, and K, it is possible to detect the state of deviation at the leading end of the image in the direction of main scanning (the image leading end deviation information).

Further, by forming the predetermined pattern of the same shape as the above at each of the leading end and the trailing end in the main scanning direction on the same sub-scanning position and measuring the distance between them, the state of deviation concerning the expansion and contraction of an image in the main scanning direction (frequency deviation information) can be detected.

Thus, the CPU 200 performs such processing as this and supplies the image leading end deviation information (⑤ in FIG. 1, ⑤ in FIG. 2) and the frequency deviation information (⑥ in FIG. 1, ⑥ in FIG. 2) to the exposure units.

OPERATION OF THE CLOCK PULSE GENERATING CIRCUIT

In the following, the operation of the clock pulse generating circuit of the first example of practice will be explained. Herein, the explanation will be given taking it for instance a case wherein it is applied to an image forming apparatus making the image formation of four colors Y, M, C, and K.

Further, the image forming apparatus using the clock pulse generating circuit of this example of the embodiment is equipped with the exposure unit for Y 250, the exposure unit for M 270, the exposure unit for C 290, and the exposure unit for K 310; hence, the following correspond to this: an apparatus which forms a four-color image during one rotation of a belt-shaped image bearing member, an apparatus which is equipped with exposure units and photoreceptor drums for the colors Y, M, C, and K respectively and carries out image forming during a single passing through of a recording paper, and so forth.

That is, the clock pulse generating circuit of this invention can be applied to any one of various kinds of image forming apparatus if only it is equipped with a plurality of exposure units and has a possibility of producing a color deviation even by using the same basic clock pulse for the exposure units.

EXAMPLE OF OPERATION (1)

First, with reference to the time chart in FIG. 6, it will be explained, with regard to an arbitrary color taken for instance, an operation for an adjustment such that, by referring to the frequency deviation information, the number of pulses of a dot clock pulse is made to be a predetermined number by shifting the delayed clock pulse to be used as the dot clock pulse successively at every certain amount of time, and also the time period during which the above-mentioned predetermined number of pulses are generated is made to be a predetermined time.

Frequency deviation information indicating the frequency deviation ER detected by the above described formation of the predetermined pattern and sensing, clock pulse period information of the clock pulse frequency TC to be obtained from the frequency of the basic clock pulse, and number-of-pixels per line information indicating the number of pixels to be formed in the direction of main scanning are given to the correction value calculating section 441 from the CPU 200. Further, from the first synchronizing point information SP1 and the second synchronizing point information SP2 from the synchronized signal detecting section 420, the number of stages of the delay elements for a cycle period NS (the number of stages of the delay elements by which delay for one cylce period of the basic clock pulses is obtained) is obtained.

Further, the CPU 200 gives deviation direction information to the select signal operating section 443; it gives {−correction} information for making a correction to give contraction against the deviation expanding in the main scanning direction, and it gives {+correction} information for making a correction to give expansion against the contraction in the main scanning direction. Here, the case of {−correction} is taken for instance.

It is assumed that the frequency deviation information ER and the deviation direction information have been obtained by the above-described formation of the predetermined pattern and its measurement. Here, suppose that ER is 6 ns and the deviation direction information={−correction}, that is, it indicates that correction to give contraction against the expanded image should be made.

First, the synchronized clock pulse detecting section 420 obtains the first synchronizing point information SP1 and the second synchronizing point information SP2 with reference to the rise-up of the index signal from the index sensor 402.

The aforesaid first synchronizing point information SP1 indicates the stage number of the delay element of the delay chain section 410 which is in synchronism with the rise-up of the index signal, and the aforesaid second synchronizing point information SP2 indicates the stage number of the delay element of the delay chain section 410 which is delayed by one period of the basic clock pulse from said first synchronizing point information SP1.

Here, assume that SP1=20, and SP2=50. Further, this condition is indicated in FIG. 7. In this drawing, it is indicated the state that the DL20 of which the stage number is 20 ((c) in FIG. 7) and the DL50 of which the stage number is 50 ((m) in FIG. 7) delayed by one period of clock pulse from the LD20 are in synchronism with the rise-up of the index signal ((a) in FIG. 7).

Next, the number of stages of the delay elements for a cycle period NS is obtained from the aforesaid first synchronizing point information SP1 and the aforesaid second synchronizing point information SP2. Now, said number of stages of the delay elements for a cycle period NS indicates the number of stages between the delay elements, the delay time difference between which is equal to the time for one period of the basic clock pulse. In this example of the embodiment, the number of stages of the delay elements for a cycle period NS=30 is obtained from the equation NS=SP2−SP1.

Further, the delay time per stage of the delay elements DT is obtained from the aforesaid NS and the period of the basic clock pulse. For example, if the period of the basic clock pulse TC is 30 ns, by using NS=30, DT=1 ns is obtained from the equation DT=TC/NS. Because the delay time per stage of the delay elements varies owing to the temperature condition of the integrated circuit, the fluctuation of the voltage of the power source supplied to the integrated circuit etc., it is to be considered that it becomes 1.5 ns in one case, and it becomes 0.5 ns in another case. However, because the frequency of the basic clock pulse does not vary, the delay time per stage of the delay elements at the time of measurement can be obtained precisely by obtaining the number of stages of the delay elements for a cycle period NS.

Then, the number of switching-over stages NC indicating the number of stages of the delay elements corresponding to the amount of time by which the phase of the dot clock pulse is to be shifted finally for the purpose of obtaining a proper image signal is obtained from the frequency deviation information ER, deviation direction information, and the delay time DT. Here, the number of switching-over stages NC=−6 is obtained from the equations ER=6 ns, the deviation direction information={−correction}, and DT=1 ns.

In order to obtain a proper image signal from the above-mentioned number of switching-over stages NC, it is appropriate to advance the stage number of the delay elements by six before the end of the scan line. That is, it is to the purpose that, in synchronism with the rise-up of the index signal, the delayed clock pulse from the delay element of the fiftieth stage is employed as the dot clock pulse at first, and after that, every after a certain elapsed time is counted by a counter, in synchronism with the select signal within one scanning line, the delayed clock pulses from the delay element of the forty ninth stage, of the forty eighth stage, of the forty seventh stage, of the forty sixth stage, of the forty fifth stage are successively substituted for the former one to be employed as the dot clock pulse, and finally the delayed clock pulse from the delay element of the forty fourth stage is employed as the dot clock pulse.

The above-described process is shown in FIG. 6. FIG. 6(f) indicates the state of employing the clock pulse from the forty fourth stage finally.

Further, if the number of stages to be shifted is larger than the number of stages of the delay elements for a cycle period, it is appropriate to circulate the select signal. In the above-described example, in the {−correction} case where SP1=20, SP2=50, and the number of stages of the delay elements for a cycle period is 30, at the timing when the select signal becomes 20, having been varied stepwise as 50, 49, - - - , 21, 20, it is appropriate to make the select signal next 49, then to vary to 48, - - - . That is, the select signal is made to be 50, 49, - - - , 21, 20 (=50), 49, 48, - - - . In addition, in the same way also in the {+correction} case, the select signal may be circulated.

The delayed clock pulse selecting section 450, having received the above-mentioned select signal, makes the selection in such a manner as to select the delayed clock pulses from the fiftieth stage, from the forty ninth stage, from the forty eighth stage, from the forty seventh stage, - - - out of the group of delayed clock pulses from the delay chain section 410, and supplies the delayed clock pulses to the exposure unit as the dot clock pulse ((g) in FIG. 6).

In this case, by selecting the delayed clock pulses from the fiftieth stage, from the forty ninth stage, from the forty eighth stage, from the forty seventh stage, - - - out of the group of delayed clock pulses, at first the delayed clock pulse (the delayed clock pulse from the fiftieth stage) synchronized with the index signal is obtained, and then at every time when the switching counter 442 counts up, the delayed clock pulses (from the forty ninth stage, from the forty eighth stage, from the forty seventh stage) of a little shorter delay (with an advanced phase) is successively periodically obtained one after another within a single scanning line. As a result of this, the {−correction} is actualized and such a correction as to finally contract the deviation expanding in the main scanning direction by 6 ns is carried out.

Further, in the {+correction} case, with the first synchronizing point information SP1 made to be the initial value, by selecting the delayed clock pulses from the twentieth stage, from the twenty first stage, from the twenty second stage, from the twenty third stage, - - - , out of the group of delayed clock pulses, at first the delayed clock pulse (from the twentieth stage) synchronized with the index signal is obtained, and successively the delayed clock pulses (from the twenty first stage, from the twenty second stage, from the twenty third stage, - - -) of a little longer delay (with a retarded phase) one after another. As a result of this, the {+correction} is actualized and such a correction as to finaly expand the deviation contracting a scanning line in the main scanning direction is carried out.

That is, with reference to the frequency deviation information, it can be performed an adjustment such that the number of pulses of a dot clock pulse in a single scanning line is made to be a predetermined number by shifting the delayed clock pulse to be used as the dot clock pulse successively every certain amount of time, and also the time period during which the above-mentioned predetermined number of pulses are generated is made to be a predetermined time.

Further, in performing the above-described operation, the switching counter 442 is let to continue to operate regardless of H_VALID, during V_VALID is active. By doing this, the above-described switching-over can be done at random positions on each of scan lines, and the switching-over of the dot clock pulse is not easy to be noticed in an image.

EXAMPLE OF OPERATION (2)

In the following, with reference to the time chart in FIG. 8, with regard to the four colors Y, M, C, and K, it will be explained an operation for an adjustment such that, by referring to the frequency deviation information, the number of pulses is made to be a predetermined number by shifting a pulse of a delayed clock pulse every certain amount of time, and also the time period during which the above-mentioned predetermined number of pulses are generated is made to be a predetermined time.

Further, in this example of operation, explanation will be given using concrete numerical values. Moreover, here, explanation will be given taking it for instance the case where the relative deviations of M, C, and K (ERym, ERyc, ERyk) with regard to Y, with Y taken as the standard, is detected, and a correction to fit M, C, and K to Y is made.

Now, assume that the number of pixels per line in the main scanning direction PH=4720, the number of stages of the delay chain section 410=256, the clock pulse frequency=33 MHz, the clock pulse period TC=30 ns, the delay time per stage DT=1 ns (0.5 ns to 2.0 ns), the number of stages of the delay elements for a cycle period NS=30, in the Y exposure unit 61, SP1y=10, SP2y=40, in the M exposure unit 62, SP1m=20, SP2m=50, ERym=+7 ns, in the C exposure unit 63, SP1c=15, SP2c=45, ERyc=−4 ns, and in the K exposure unit 64, SP1k=25, SP2k=55, ERyk=+2 ns.

In this case, the correction for M should be −7 sec, the correction for C should be +4 ns, and the correction for K should be −2 ns. Therefore, the numbers of switching-over stages as has been described in the foregoing (the number of switching-over stages NCm, the number of switching-over stages NCc, and the number of switching-over stages NCk) are obtained, and the select signal operating section 443 generates the respective select signals respectively for M, C, and K in accordance with the result of the counting. In addition, with regard to Y, the select signal may be fixed because it is the standard for M, C, and K.

In the delayed clock pulse selecting section 450 having been received such a select signal as mentioned in the above, with regard to Y, the delayed clock pulse from the fortieth stage is selected out of the group of delayed clock pulses from the delay chain section 410, and is supplied to the exposure unit for Y 61 ((c) in FIG. 8).

Further, at each time when the switching counter 442 counts up, the delayed clock pulse selecting section 450, with regard to M, selects the delayed clock pulses from the fiftieth stage, from the forty ninth stage, from the forty eighth stage, from the forty seventh stage, - - - , and from the forty third stage out of the group of delayed clock pulses from the delay chain section 410, and supplies each of them as a dot clock pulse to the exposure unit for M 62 ((d) in FIG. 8). Owing to this, the correction of −7 sec in total is carried out.

Further, at each time when the switching counter 442 counts up, the delayed clock pulse selecting section 450, with regard to C, selects the delayed clock pulses from the forty fifth stage, from the forty sixth stage, from the forty seventh stage, and from the forty eighth stage out of the group of delayed clock pulses from the delay chain section 410, and supplies each of them as a dot clock pulse to the exposure unit for C 63 ((e) in FIG. 8). Owing to this, the correction of +4 sec in total is carried out.

Further, at each time when the switching counter 442 counts up, the delayed clock pulse selecting section 450, with regard to K, selects the delayed clock pulses from the fifty fifth stage and from the fifty fourth stage out of the group of delayed clock pulses from the delay chain section 410, and supplies each of them as a dot clock pulse to the exposure unit for K 64 ((f) in FIG. 8). Owing to this, the correction of −2 sec in total is carried out.

Besides, the number of switching-over NC of the select signal (delayed clock pulse) is expressed by the following equation (1):

$$NC = ER/(TC/NS) \qquad (1).$$

By the above-described processing, the deviations for Y, M, C, and K in the direction of main scanning is eliminated, and an image without color deviation is to be formed. Further, by letting the switching counter 442 continue to operate, the above-described switching can be done at random positions in each of scan lines, which makes the switching-over of the dot clock pulse difficult to notice in an image.

DETAILED STRUCTURE OF THE SECOND EXAMPLE OF PRACTICE OF THE CLOCK PULSE GENERATING CIRCUIT

In the following, the second example of practice of the clock pulse generating circuit of this invention will be explained in detail.

FIG. 9 is a block diagram showing the circuit structure in the electrical exposure unit 400 of the second example of practice in each of the exposure unit for Y 250, the exposure unit for M 270, the exposure unit for C 290, and the exposure unit for K 310, together with the CPU 200 etc. In addition, in this FIG. 9, only the exposure unit 400 is shown, but actually the equivalent ones are provided in the exposure units for M, C, and K respectively.

In this FIG. 9, the first delay chain section 410 is th group of delay elements making up the first delayed signal generating section of this invention for obtaining a plurality of delayed signals having phases which are a little different from one another respectively (the first group of delayed clock pulses: ① in FIG. 9) by delaying the input signal (basic clock pulse from the basic clock pulse generating section 401) and is made up in a manner as shown in FIG. 3 described in the foregoing.

The synchronized clock pulse detecting section 420 is a detecting means for detecting the stage number (synchronizing point) of the delayed clock pulse which is synchronized with the index signal out of the first group of the delayed signals (① in FIG. 9), and outputs the synchronizing point information (② in FIG. 9).

In the above, it is desirable that the synchronized clock pulse detecting section 420 can output the first synchronizing point information SP1 at which synchronization with the index signal firstly occurs and the second synchronizing point information SP2 at which synchronization with the index signal secondly occurs, among the the first group of delayed clock pulses (① in FIG. 9).

The image leading end control section 430 receives the synchronizing point information (② in FIG. 9) from the synchronized clock pulse detecting section 420, and outputs the synchronizing point correction information (③ in FIG. 9) on the basis of the image leading end deviation information (④ in FIG. 9) from the CPU 200.

The delayed clock pulse switching control section 440 obtains the phase correction value on the basis of the synchronizing point correction information (④ in FIG. 9) from the image leading end control section 430 and the frequency deviation information (⑤ in FIG. 9) from the CPU 200, and outputs the upper rank select signal (⑥ in FIG. 9) indicating of which phase the delayed clock pulse is to be selected out of the first group of delayed clock pulses (① in FIG. 9).

The delayed clock pulse selecting section 450 receives the upper rank select signal (⑥ in FIG. 9) from the delayed clock pulse switching control section 440, selecting the delayed clock pulse having a correspondent phase out of the first group of the delayed clock pulses (① in FIG. 9), and outputs it as the first dot clock pulse (⑧ in FIG. 9).

Further, it is desirable that the second delay chain section 412 is composed of the delay elements cascaded like a chain with such a number of stages as to be capable of generating the second group of delayed clock pulses (① in FIG. 9) any one of which has a slightly different phase from the others, each phase shift being made by further finely dividing the amount of phase shift produced by the first delay chain section 410.

Further, the second selecting section 452 receives the lower rank select signal (⑦ in FIG. 9) from the delayed clock pulse switching control section 440, selecting a delayed clock pulse having the correspondent phase out of the second group of delayed clock pulses (⑨ in FIG. 9), and outputs it as a final dot clock pulse.

Further, the PWM section 460 receives the final dot clock pulse and the image signal, and generates a signal for driving the laser diode (LD) 470. From the LD 470, a laser beam which is modulated for pulse width in accordance with the value of the image signal is emitted, and applied to the image bearing member 1.

Further, the delayed clock pulse switching control section 440 is made up in a manner such that, with reference to the frequency deviation information and the synchronizing point information, it outputs the upper rank select signal and the lower rank select signal, both determining respectively of which phase a delayed clock pulse is to be selected out of each of the first group of delayed clock pulses and the second group of delayed clock pulses.

In the above, each of the select signals for determining of which phase a delayed clock pulse is to be selected is let to be circulated, while they are sequentially switching over the delayed clock pulses corresponding to two bits of the synchronizing point information.

Further, the CPU 200 carries out the detecting process of the predetermined pattern composed of a horizontal line and an oblique line making an acute angle with the former shown in FIG. 5 in the same way as the first example of practice, and supplies the image leading end deviation information (④ in FIG. 9) and the frequency deviation information (⑤ in FIG. 9) to the exposure units.

EXAMPLE OF OPERATION (3)

First, with reference to the time chart in FIG. 10, with regard to an arbitrary color taken for instance, it will be explained up to a point where the first dot clock pulse is generated an operation for an adjustment such that, with reference to the frequency deviation information, the number of pulses is made to be a predetermined number by using delayed clock pulses having different phases respectively from one another for each pulse, and also the time during which this predetermined number of pulses are generated is made to be a predetermined amount of time.

Frequency deviation information indicating the frequency deviation ER detected by the above described formation of the predetermined pattern and sensing, clock pulse period information of the clock pulse frequency TC to be obtained from the frequency of the basic clock pulse, and number-of-pixels per line information indicating the number of pixels to be formed in the direction of main scanning are given to the correction value calculating means in the delayed clock pulse switching control section 440 from the CPU 200. Further, from the first synchronizing point information SP1 and the second synchronizing point information SP2 from the synchronized signal detecting section 420, the number of stages for a period NS is obtained.

Now, the correction value calculating means in the delayed clock pulse switching control section 440 obtains the correction count value (count load data) CC corresponding to the correction value on the basis of the equation shown in the following:

$$CC = PH \times (NS/TC)/ER \qquad (2).$$

This correction count value CC is obtained for the purpose that the switching count means in the delayed clock pulse switching control section 440 counts down the number of pulses and makes the switching-over of the upper rank select signal and the switching-over of the lower rank select signal. Accordingly, the correction value CC for switching over becomes smaller as the correction value becomes larger.

Further, with reference to the rise-up of the index signal from the index sensor 402, the synchronized clock pulse detecting section 420 obtains the stage number of the first delay chain section at which a delayed clock pulse synchronized with this rise-up of the index signal is obtained as the synchronizing point information.

Here, suppose that the first synchronizing point information SP1 is obtained as 20, and the second synchronizing point information SP2 is obtained as 50. Thus, in this case, the above-described number of stages for a period NS is 30.

Now, by the scanning by the laser beam of the exposure unit, the index sensor generates the index signal at the timing when it detects the laser beam ((1) in FIG. 10(*a*)). After this, H_VALID indicating the effective area in the horizontal direction becomes active.

Then, the switching count means in the delayed clock pulse switching control section 440 continues to count down repeatedly the aforesaid correction count value CC in accordance with the basic clock pulse. Further, every time when the count value becomes zero by counting down, it gives the count data as an interrupting signal to the select signal operating means 443 in the delayed clock pulse switching section 440 ((d) to (f) in FIG. 6).

Further, the CPU 200 gives deviation direction information to the select signal operating means 443 in the delayed clock pulse switching control section 440; it gives {−correction} information for making a correction to give contraction against the deviation expanding in the main scanning direction, and it gives {+correction} information for making a correction to give expansion against the contraction in the main scanning direction. Here, the case of {−correction} is taken for instance.

It is assumed that the frequency deviation information ER and the deviation direction information have been obtained by the above-described formation of the predetermined pattern and its measurement. Here, suppose that ER is 6 ns and the deviation direction information={−correction}, that is, it indicates that correction to give contraction against the expanded image should be made.

First, the synchronized clock pulse detecting section 420 obtains the first synchronizing point information SP1 and the second synchronizing point information SP2 with reference to the rise-up of the index signal from the index sensor 402.

The aforesaid first synchronizing point information SP1 indicates the stage number of the delay element of the first delay chain section 410 which is in synchronism with the rise-up of the index signal, and the aforesaid second synchronizing point information SP2 indicates the stage number of the delay element of the first delay chain section 410 which is delayed by one period of the basic clock pulse from said first synchronizing point information SP1.

Here, assume that SP1=20, and SP2=50. Further, this condition is indicated in FIG. 7. In this drawing, it is indicated the state that the DL20 of which the stage number is 20 ((c) in FIG. 7) and the DL50 of which the stage number is 50 ((m) in FIG. 7) delayed by one period of clock pulse from the LD20 are in synchronism with the rise-up of the index signal ((a) in FIG. 7).

Next, the number of the stages for a period NS is obtained from the aforesaid first synchronizing point information SP1 and the aforesaid second synchronizing point information SP2. Now, said number of stages for a period NS indicates the number of stages between the delay elements, the delay time difference between which is equal to the time for one period of the basic clock pulse. In this example of the embodiment, the number of stages for a period NS=30 is obtained from the equation NS=SP2−SP1.

Further, the delay time per stage of the delay elements DT is obtained from the aforesaid NS and the period of the basic clock pulse. For example, if the period of the basic clock pulse TC is 30 ns, by using NS=30, DT=1 ns is obtained from the equation DT=TC/NS.

Then, the number of switching-over NC indicating the number of stages of the delay elements in the first delay chain section corresponding to the amount of time by which the phase of the dot clock pulse is to be shifted finally for the purpose of obtaining a proper image signal is obtained from the frequency deviation information ER, deviation direction information, and the delay time DT. Here, the number of switching-over NC=−6 is obtained from the equations ER=6 ns, the deviation direction information={−correction}, and DT=1 ns.

In order to obtain a proper image signal from the above-mentioned number of switching-over NC, it is appropriate to advance the stage number of the delay elements by six before the end of the scan line. That is, it is to the purpose that, in synchronism with the rise-up of the index signal, the delayed clock pulse from the delay element of the fiftieth stage is employed at first, and after that, in synchronism with the upper rank select signal within one scan line, the delayed clock pulses from the delay element of the forty ninth stage, of the forty eighth stage, of the forty seventh stage, of the forty sixth stage, of the forty fifth stage are successively substituted for the former one to be employed, and finally the delayed clock pulse from the delay element of the forty fourth stage is employed.

Further, if the number of switching-over is larger than the number of stages per period, it is appropriate to circulate the upper rank select signal. In the above-described example, in the {−correction} case where SP1=20, SP2=50, and the number of stages per period is 30, at the timing when the upper rank select signal becomes 20, having been varied stepwise as 50, 49, - - - , 21, 20, it is appropriate to make it next 49, then to vary it stepwise to 48, - - - , because the upper rank select signal 20 and the upper rank select signal 50 are of the same phase. That is, the upper rank select signal is made to be 50, 49, - - - , 21, 20 (=50), 49, 48, - - - . In addition, in the same way also in the {+correction} case, the select signal may be circulated.

Further, in the case where the {−correction} is made in such a manner as to be varied stepwise every four stages like 50, 46, 42, - - - , 22, 18, it exceeds the SP1=20; then, next to 18, it is made to be 50−(20−18)−4=44. That is, by making it be in the state of being added by an amount exceeding the synchronizing point and one correction value for continuing to circulate, the circulation can be done without problem.

In the delayed clock pulse selecting section 450 having received such an upper rank select signal as this, the delayed clock pulses from the fiftieth stage, from the forty ninth stage, from the forty eighth stage, from the forty seventh stage, - - - are selected out of the first group of delayed clock pulses (①in FIG. 9) from the first delay chain section 410, and each of them is supplied to the second delay chain section 412 as a first dot clock pulse ((g) in FIG. 10).

Incidentally, in the case where the number of pixels per line is 6000 dots, the delay time per stage of the first group of the delayed clock pulses is 1 ns, and the amount of the frequency deviation ER=−150 ns, the above-mentioned switching-over of the first dot clock pulse is carried out every 40 dots. This situation is shown in FIG. 11(a). In this condition, a precise correction is made finally, but stepwise switching-over is done in the process of scanning. Therefore, the second delay chain section 412 receives said first dot clock pulse and generates the second group of delayed clock pulses (⑨ in FIG. 9) having slightly different phases respectively from one another by further finely dividing the amount of phase shift generated in the first delay chain section 410, and a delayed clock pulse having a slightly different phase from the former is selected for every dot in the second selecting section 452.

In this case, it is carried out in the second selecting section 452 the selection based on the lower rank select signal (⑦ in FIG. 9) from the delayed clock pulse switching control section 440 in order that the {−correction} of 1/40=0.025 ns for every dot may be made. This situation is shown in FIG. 11(b). In addition, even though the delay time in this second delay chain section 412 is not precisely controlled, if only the above described first delay chain section is controlled precisely, finally the correction can be made precisely.

Accordingly, because the precision of the second delay chain section 412 for switching over the phase finely is not so much required, a circuit of low cost can be employed; however, finally a precise correction can be done by the first delay chain section 410.

Then, the final dot clock pulse which has been subjected to the above-mentioned fine switching-over of phase for every dot is supplied to the PWM section 460, and a laser beam in accordance with an image signal is emitted from the LD470.

Further, because the above-mentioned delay time in the second delay chain section 412 is not so precisely controlled that it does not always occur that the position of ① in FIG. 11(b) is in the state of a very fine step, that is, almost of smooth connection. Therefore, in performing the above-mentioned operation, the switching counting means in the delayed clock pulse switching control section 440 is let to continue to operate regardless of H_VALID during the time period that V_VALID is active. By doing this, the above-described switching of the first group of delayed clock pulses is done at random positions on each of scan lines, which makes the presence of switching-over positions (① in FIG. 11(b)) of the first dot clock pulse difficult to be noticed in an image.

EXAMPLE OF OPERATION (4)

In the following, with reference to the time chart in FIG. 12, it will be explained an operation for an adjustment such that, by referring to the frequency deviation information of the writing units 1 to 4 for the four colors Y, M, C, and K respectively, the number of pulses is made to be a predetermined number by shifting a pulse of a delayed clock pulse every certain amount of time, and also the time period during which the above-mentioned predetermined number of pulses are generated is made to be a predetermined time.

Further, in this example of operation, explanation will be given using concrete numerical values. Moreover, here, explanation will be given taking it for instance the case where the relative deviations of M, C, and K (ERym_data, ERyc_data, ERyk_data) with regard to Y, with an image for Y taken as the standard, is detected, and a correction to fit M (writing unit 2), C (writing unit 3), and K (writing unit 4) to Y (writing unit 1) is made.

Now, assume that the number of pixels per line in the main scanning direction PH=4720, the number of stages of the first delay chain section 410=256, the clock pulse frequency=33 MHz, the clock pulse period TC=30 ns, the delay time per one stage DT=1 ns (0.5 ns to 2.0 ns), the number of stages of delay elementss for a cycle period NS=30.

Further, let the error value per one pixel to be ERROR_data, the error value per a single line to be ER_data, the frequency deviation information to be FREQ_data, and the correction value correponding to the number of sages NS to be REVISE_data, then following equations are given:

ERROR_data=FREQ_data÷PH,

REVISE_data=ERROR_data×NS.

Further, suppose that, in Y,

SP1y=10, SP2y=40, and NS=30.

(1) First, it is assumed that in M (writing unit 2),

SP1m=20, SP2m=50, NS=30, and ERym_data=(3+4/32) clock pulses.

The correction value REVISE_data in this case is approximated as follows:

$$((+3+(4/32))\div 4720) \times 30 = ((100/32) \div 4720) \times 30 = 0.01986228813559 \approx 0.0199 \text{ (ns)}.$$

Then, the above-derived correction value of the second delay chain section 412 is used in correction for every dot. That is, the following calculation is conducted sequentially for each dot. Then, at each time when the correction value exceeds the delay time per one stage DT (here: 1 ns), the delay element is switched over to the next delay element by one stage (here, 20th→21th→ . . . ) and selects the delay clock pulses of the next delay element.

20.0000+0.0199=20.0199, 20.0199+0.0199=20.0398, 20.0398+0.0199=20.0597, 20.0597+0.0199=20.0796, - - - .

In other words, the stage number may be determined by referring an integral number of the accumulated value.

Further, with regard to the decimal section which is rounded down, it is absorbed every time within a range of a requested precision when the one stage correction (correction of the integer section in the case where one stage is 1 ns) is carried out.

(2) Next, it is assumed that, in C (writing unit 3), SP1$c$=17, SP2$c$=47, NS=30, and ERyc_data=-(6+17/32) clock pulses.

The correction value REVISE_data in this case is approximated as follows:

$$((-(6+4\ (17/32))\div4720)\times\mathbf{30}=((-209/32)\div4720)\times30=-0.04151218220339\approx-0.0415\ (ns)$$

Then, the above-derived correction value of the second delay chain section 412 is used in correction for every dot. That is, the following calculation is conducted sequentially for each dot. Then, at each time when the correction value exceeds the delay time per one stage DT (here: 1 ns), the delay element is switched over to the next delay element by one stage (here, 47th→46th→ . . . ) and selects the delay clock pulses of the next delay element.

47.0000-0.0415=46.9585, 46.9585-0.0415=46.9170, 46.9170-0.0415=46.8755, 46.8755-0.0415=46.8340,]- - - .

In other words, the stage number may be determined by referring an integral number of the accumulated value.

Further, with regard to the decimal section which is rounded down, it is absorbed every time within a range of a requested precision when the one stage correction (correction of the integer section in the case where one stage is 1 ns) is carried out.

(3) Next, it is assumed that, in K (writing unit 4), SP1$k$=26, SP2$k$=56, NS=30, and ERyk_data=-(6+17/32) clock pulses.

The correction value REVISE_data in this case is approximated as follows:

$$(+((34+(3/32))\div4720)\times30=((1091/32)\div4720)\times30=0.2166975635593\approx0.2167\ (ns)$$

Then, the above-derived correction value of the second delay chain section 412 is used in correction for every dot. That is, the following calculation is conducted sequentially for each dot. Then, at each time when the correction value exceeds the delay time per one stage DT (here: 1 ns), the delay element is switched over to the next delay element by one stage (here, 26th→27th→ . . . ) and selects the delay clock pulses of the next delay element.

26.0000+0.2167=26.2167, 26.2167+0.2167=26.4334, 26.4334+0.2167=26.6501, 26.6501+0.2167=26.8668. - - - .

In other words, the stage number may be determined by referring an integral number of the accumulated value, with regard to the rounding down in the above calculation, it should be determined in connection with the required precision. For example, the overall required precision for a line is assumed to be ±0.5 ns. In such a case, the allowed error per pixel is 0.5/4720=0.0001059. That is, even though the value which is smaller than this allowed error per pixel is rounded down, the required precision as a total for a line is to be satisfied. Accordingly, in this case, even though the fifth decimal or smaller than this is rounded down, the obtained value is within the range of the allowed error, and the overall error for a line of 4720 pixels satisfies the condition of the overall required precision of ±0.5 ns. Here, an example of calculation by decimal numbers is shown, but in the calculation by digital data, it is to the purpose to omit calculation for lower bits than that corresponding to the allowed error. Owing to this, the number of bits required for calculation can be reduced. In addition, if the capacity for calculation has a margin, rounding down operation need not to be done.

Further, a four-color image forming apparatus equipped with four writing units has been explained herein; however, in the case of two colors at the minimum, color deviation can be eliminated by performing a similar processing. Moreover, it is possible to employ the invention in an image forming apparatus having a larger number of writing units.

Incidentally, each of the above basic clock pulse generating section, delayed clock pulse generating section (delay chain section, control section, selecting section and CPU may be constructed independently from others. However, they may be incorprated into a single chip. Also, a part of them may be constructed commonly to some function.

What is claimed is:

1. An image forming apparatus, comprising:

an image forming device to scan in a main scanning direction in synchronization with dot clock pulses for each scanning line so as to form an image;

a basic clock pulse generating section to generate basic lock pulses with a predetermined interval;

a delayed clock pulse generating section to generate a group of plural delayed clock pulses having different phases respectively by delaying the basic clock pulse generate by the basic clock pulse generating section into plural delay stages;

a synchronism detecting section to detect at least two delayed clock pulses synchronizing with an index signal from the plural delayed clock pulses generated by said delayed clock pulse generating section;

a calculating section to calculate a number of delay stages existing within a given time period on the basis of the two synchronizing delayed clock pulses detected by the synchronism detecting section; and a clock pulse control section to select the delayed clock pulses sequentially delayed from the synchronizing delayed clock pulse from the group of plural delayed clock pulses within a predetermined time period on the basis of the calculated number of delay stages so as to control a number of clock pulses outputted as the dot clock pulses during the predetermined time period.

2. The image forming apparatus of claim 1, further comprising:

a deviation detecting section to detect an amount of deviation in a length of each scanning line, and a judging section to judge a number of switching-over delay stages to be delayed from the synchronizing delayed clock pulse during the predetermined time period on the basis of the amount of deviation, wherein the clock pulse control section selects the delayed clock pulses sequentially delayed from the synchronizing delayed clock pulse from the group of plural delayed clock pulses within the predetermined time period on the basis of the number of switching-over delay stages.

3. The image forming apparatus of claim 2, wherein the deviation detecting section comprises a pattern image forming section to make the image forming device to form a specific pattern image; and a sensor to read the specific pattern image so as to detect a length of each scanning line, and the deviation detecting section calculates the amount of deviation by comparing the length of scanning line detected by the sensor.

4. The image forming apparatus of claim 1, wherein the image forming device comprises plural scanning exposure devices, and wherein the image forming apparatus further comprises deviation detecting section to detect an amount of deviation in a length of each scanning line of each of the plural scanning exposure devices, and a judging section to judge a number of switching-over delay stages to be delayed from the synchronizing delayed clock pulse during the predetermined time period on the basis of the amount of deviation, and the clock pulse control section selects the delayed clock pulses sequentially delayed from the synchronizing delayed clock pulse from the group of plural delayed clock pulses within the predetermined time period on the basis of the number of switching-over delay stages.

5. The image forming apparatus of claim 4, wherein the image forming device comprises plural developing devices and the plural scanning exposure devices corresponds to the plural developing devices.

6. The image forming apparatus of claim 1, further comprising a switching-over counter to count a given time period, wherein the clock pulse control section selects the delayed clock pulses sequentially delayed from the synchronizing delayed clock pulse from the group of plural delayed clock pulses at each time when the switching-over counter counts up the given time period.

7. The image forming apparatus of claim 6, further comprising a judging section to judge a number of switching-over delay stages to be delayed from the synchronizing delayed clock pulse during the predetermined time period on the basis of inputted information, wherein the switching-over counter determines the given time period to be counted on the basis of the number of switching-over delay stages obtained by the judging section and the clock pulse control section selects the delayed clock pulses sequentially delayed from the synchronizing delayed clock pulse from the group of plural delayed clock pulses at each time of counting up the given time period.

8. The image forming apparatus of claim 1, wherein the calculating section calculates an average amount of deviation of each clock pulse on the basis of inputted information, and the clock pulse control section selects the delayed clock pulses sequentially delayed from the synchronizing delayed clock pulse from the group of plural delayed clock pulses on the basis of the average amount of deviation of each clock pulse obtained by the calculating section.

9. The image forming apparatus of claim 8, wherein the clock pulse control section determines whether or not to select the delayed clock pulses sequentially delayed from the synchronizing delayed clock pulse for each clock pulse on the basis of the average amount of deviation of each clock pulse obtained by the calculating section.

10. The image forming apparatus of claim 8, wherein the clock pulse control section accumulates the average amount of deviation of each clock pulse obtained by the calculating section for each clock pulse and selects the delayed clock pulses sequentially delayed from the synchronizing delayed clock pulse in accordance with the accumulated amount of deviation.

11. The image forming apparatus of claim 8, wherein the clock pulse control section calculates an amount of deviation per each clock pulse on the basis of the number of delay stages, accumulates amount of deviation per each clock pulse for each pulse in the stage number of the synchronizing delayed clock pulse and selects an integral number of the accumulated value as the new stage of the delayed clock pulse.

12. A clock pulse generating device, comprising:

a basic clock pulse generating section to generate basic clock pulses with a predetermined interval;

a delayed clock pulse generating section to generate a group of plural delayed clock pulses having different phases respectively by delaying the basic clock pulse generate by the basic clock pulse generating section into plural delay stages;

a synchronism detecting section to detect at least two delayed clock pulses synchronizing with an index signal from the plural delayed clock pulses generated by said delayed clock pulse generating section;

a calculating section to calculate a number of delay stages existing within a given time period on the basis of the two synchronizing delayed clock pulses detected by the synchronism detecting section; and a clock pulse control section to select the delayed clock pulses sequentially delayed from the synchronizing delayed clock pulse from the group of plural delayed clock pulses within a predetermined time period on the basis of the calculated number of delay stages so as to control a number of clock pulses outputted during the predetermined time period.

13. The clock pulse generating device of claim 12, wherein the at least two delayed clock pulses detected by the synchronism detecting section are synchronized with the leading end of the index signal.

14. The clock pulse generating device of claim 12, further comprising a judging section to judge a number of switching-over delay stages to be delayed from the synchronizing delayed clock pulse during the predetermined time period on the basis of inputted information, wherein the clock pulse control section selects the delayed clock pulses sequentially delayed from the synchronizing delayed clock pulse from the group of plural delayed clock pulses within the predetermined time period on the basis of the number of switching-over delay stages.

15. The clock pulse generating device of claim 12, further comprising a switching-over counter to count a given time period, wherein the clock pulse control section selects the delayed clock pulses sequentially delayed from the synchronizing delayed clock pulse from the group of plural delayed clock pulses at each time when the switching-over counter counts up the given time period.

16. The clock pulse generating device of claim 12, further comprising
  a judging section to judge a number of switching-over delay stages to be delayed from the synchronizing delayed clock pulse during the predetermined time period on the basis of inputted information,
  wherein the switching-over counter determines the given time period to be counted on the basis of the number of switching-over delay stages obtained by the judging section and the clock pulse control section selects the delayed clock pulses sequentially delayed from the synchronizing delayed clock pulse from the group of plural delayed clock pulses at each time of counting up the given time period.

17. The clock pulse generating device of claim 16, wherein the switching-over counter repeats counting the given time period by the same times corresponding the number of switching-over delay stages during the predetermined time period.

18. The clock pulse generating device of claim 12, wherein the clock pulse control section detects a switching-over direction and controls increment or decrement of the number of switching-over delay stages.

19. The clock pulse generating device of claim 12, wherein the calculating section calculates an average amount of deviation of each clock pulse on the basis of inputted information, and the clock pulse control section selects the delayed clock pulses sequentially delayed from the synchronizing delayed clock pulse from the group of plural delayed clock pulses on the basis of the average amount of deviation of each clock pulse obtained by the calculating section.

20. The clock pulse generating device of claim 19, wherein the clock pulse control section determines whether or not to select the delayed clock pulses sequentially delayed from the synchronizing delayed clock pulse for each clock pulse on the basis of the average amount of deviation of each clock pulse obtained by the calculating section.

21. The clock pulse generating device of claim 19, wherein the clock pulse control section accumulates the average amount of deviation of each clock pulse obtained by the calculating section for each clock pulse and selects the delayed clock pulses sequentially delayed from the synchronizing delayed clock pulse in accordance with the accumulated amount of deviation.

22. The clock pulse generating device of claim 19, wherein the clock pulse control section calculates an amount of deviation per each clock pulse on the basis of the number of delay stages, accumulates amount of deviation per each clock pulse for each pulse in the stage number of the synchronizing delayed clock pulse and selects an integral number of the accumulated value as the new stage of the delayed clock pulse.

* * * * *